United States Patent [19]

Brockmeyer et al.

[11] Patent Number: 5,546,582
[45] Date of Patent: Aug. 13, 1996

[54] EXTENSION OF TWO PHASE COMMIT PROTOCOL TO DISTRIBUTED PARTICIPANTS

[75] Inventors: Roger L. Brockmeyer, San Jose; Richard Dievendorff, Mountain View, both of Calif.; Daniel E. House, Scarborough, Canada; Earle H. Jenner, San Jose, Calif.; Margaret K. LaBelle, Poughkeepsie; Michael G. Mall, LaGrangeville, both of N.Y.; Stuart L. Silen, Morgan Hill, Calif.

[73] Assignee: International Business Machines Corporation, Armonk, N.Y.

[21] Appl. No.: 384,484

[22] Filed: Feb. 2, 1995

Related U.S. Application Data

[63] Continuation of Ser. No. 932,835, Aug. 20, 1992, abandoned.

[51] Int. Cl.$^6$ ................................... H04L 29/08
[52] U.S. Cl. .................. 395/650; 395/600; 395/200.19
[58] Field of Search ............................. 395/200, 200.19, 395/600, 650

[56] References Cited

U.S. PATENT DOCUMENTS

| | | | |
|---|---|---|---|
| 4,648,031 | 3/1987 | Jenner | 395/182.08 |
| 5,212,788 | 5/1993 | Lomet et al. | 395/600 |
| 5,241,675 | 8/1993 | Sheth et al. | 395/600 |
| 5,258,982 | 11/1993 | Britton et al. | 370/110.1 |
| 5,325,528 | 6/1994 | Klein | 395/650 |
| 5,329,626 | 7/1994 | Klein et al. | 395/375 |
| 5,335,343 | 8/1994 | Lampson et al. | 395/182.17 |
| 5,371,886 | 12/1994 | Britton et al. | 395/600 |
| 5,390,302 | 2/1995 | Johnson et al. | 395/200.01 |
| 5,410,684 | 4/1995 | Ainsworth et al. | 395/182.16 |
| 5,428,771 | 6/1995 | Daniels et al. | 395/650 |
| 5,432,926 | 7/1995 | Citron et al. | 395/182.02 |
| 5,452,445 | 9/1995 | Hallmark et al. | 395/600 |

OTHER PUBLICATIONS

Kurt Rothermel; An Open Commit Protocol Preserving Consistency in the Presence of Commission Failures; Distributed Computing System, 1993 International Conference; 1993; pp. 168–177.

Huang et al.; A Quorum–based Commit and Termmination Protocol for Distributed Database Systems; Data Engineering, 1988 4th International Conference; 1988; pp. 136–143.

(List continued on next page.)

*Primary Examiner*—Krisna Lim
*Assistant Examiner*—Kenneth R. Coulter
*Attorney, Agent, or Firm*—Lawrence D. Cutter; William B. Porter; Frederick W. Gibb, III

[57] ABSTRACT

An extension of the two phase commit protocol allows distributed participation among physically distant agents independent of the communications mechanism being used in a data processing system. An extra stage of processing is added to the two phase commit protocol called End Phase One Processing (EPOP) which enables a distribution of the coordinator function across systems using any communication mechanism. EPOP is an extra stage in which a participant can receive control. In this extra stage, a participant flows two phase commit protocol sequences to distributed systems. The communication mechanism is used in such a way that it becomes part of a distributed coordinator. The coordinator itself does not need knowledge of other systems. The extra stage of processing is enabled by an operating system service called Enable End Phase One Exit Processing (EEPOEP). EEPOEP causes an extension of two phase commit protocol to be used on the issuing system. In this way, not only distributed databases can be supported, but also distributed users and distributed generic resource managers. A new response, called ABSTAIN, can be used by a resource manager in response to a PREPARE signal from the coordinator. This response from the resource manager to the coordinator indicates that the resource manager wants to continue to be involved with the unit of work two phase commit process but does not want to influence the final decision (i.e., COMMIT or BACKOUT) of the unit of work.

21 Claims, 14 Drawing Sheets

OTHER PUBLICATIONS

Barker et al., Reliable transaction execution in Multidatabase Systems, First International Workshop on Interoperability in Multidatabase Systems, Apr. 7, 1991 pp. 344–347.

Rothermel et al., Open Commit Protocols for the Tree of Processes Model 10th International Conf. on Distributed Computing Systems, May 28, 1990, pp. 236–244.

Zimran et al., The Two–Phase Commit Performance of the DECdtm Services 11th Symposium on Reliable Distributed Systems, Oct. 5 1992 pp. 29–38.

Hobbs, the Distributed Features in Rdb, IEE Colloguium on 'Distributed Databases' (Digest No. 229), Dec. 11, 1992.

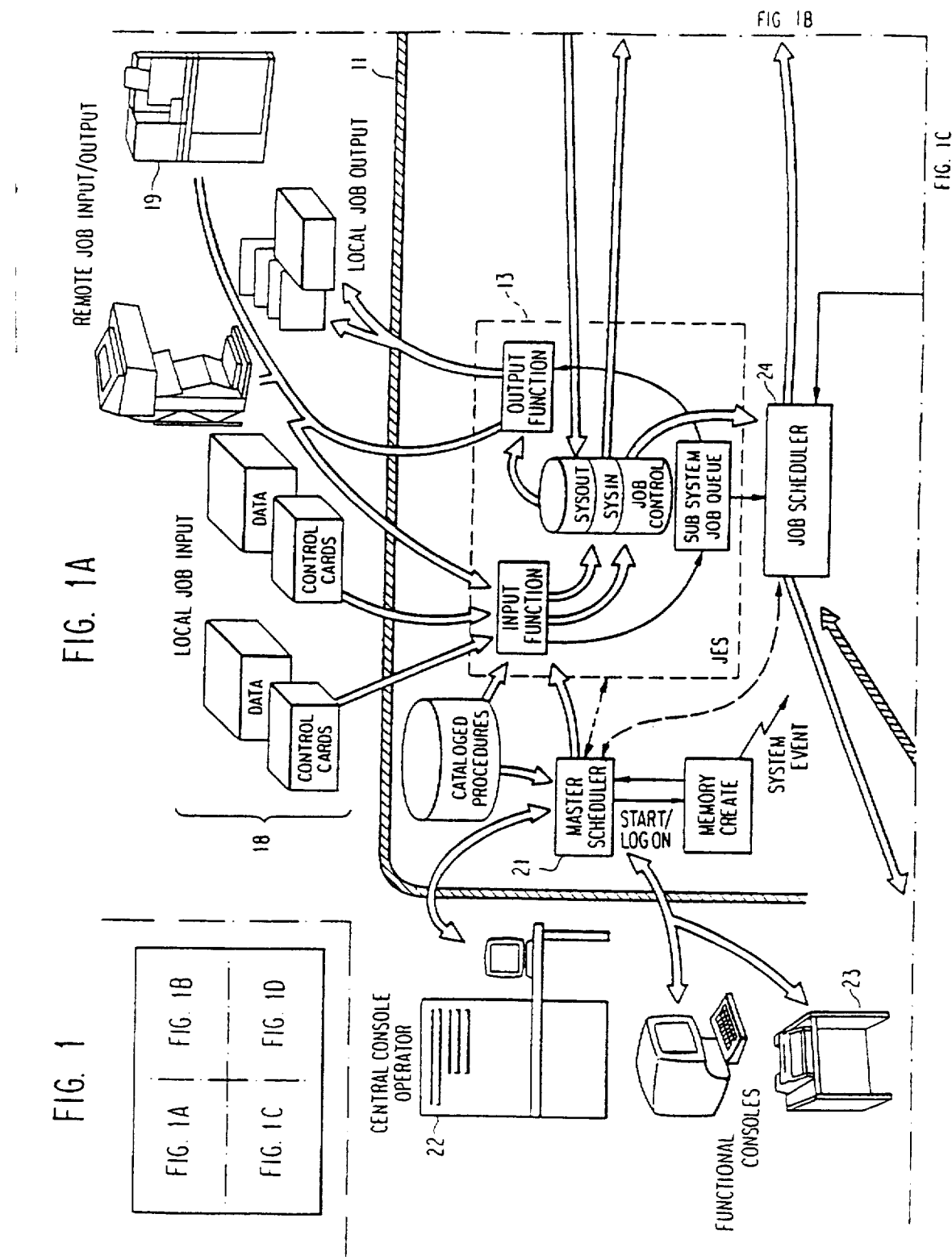

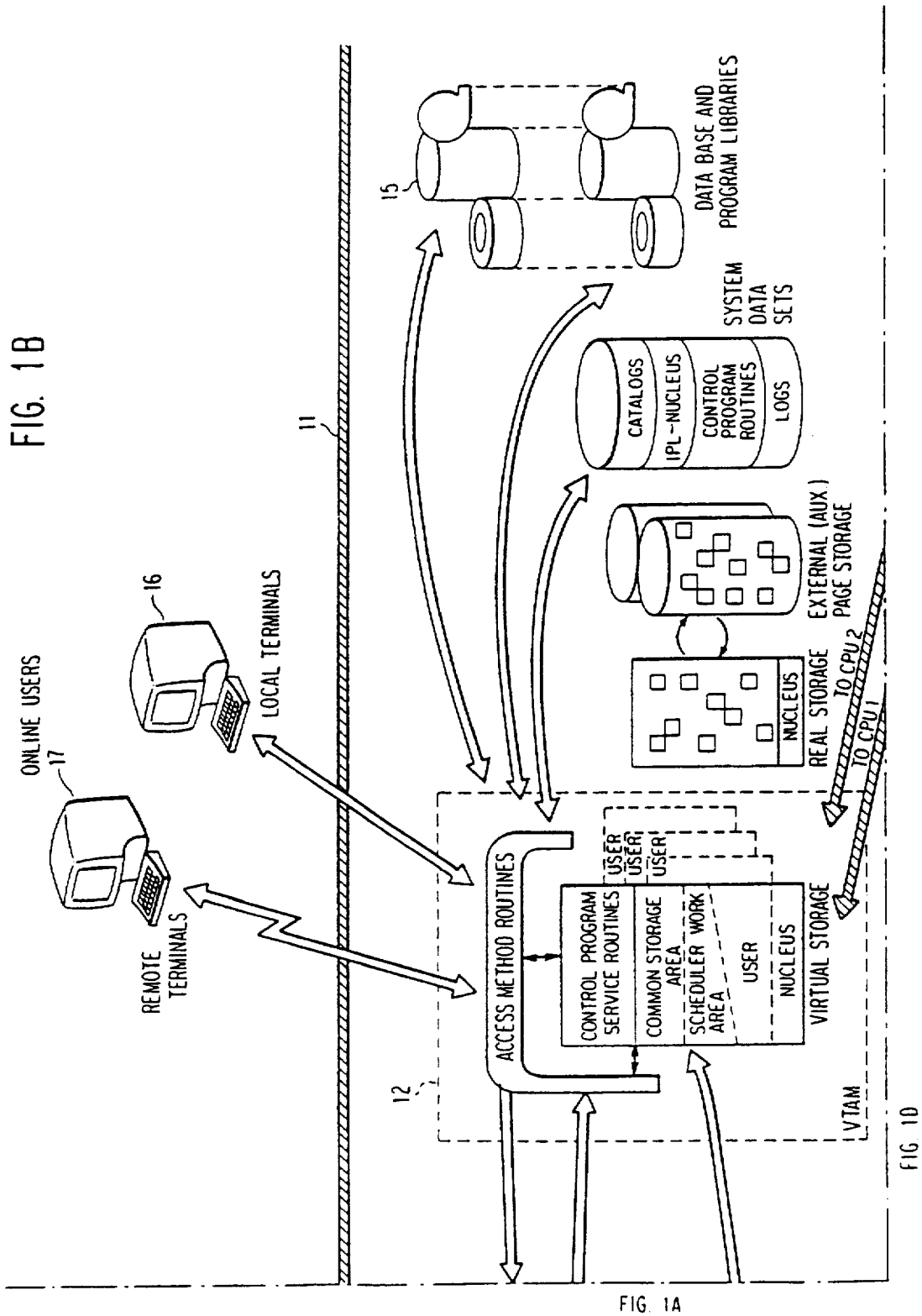

EXTENSION OF TWO PHASE COMMIT PROTOCOL TO DISTRIBUTED PARTICIPANTS

This is a Continuation of application Ser. No. 07/932,835 filed Aug. 20, 1992 now abandoned.

BACKGROUND OF THE INVENTION

Field of the Invention

The present invention generally relates to data processing systems and, more particularly, to an extension of a two phase commit protocol which allows participants to extend the decision making process in order to consult with remote participants or perform other local operations. The invention may be used to create systems that are able to achieve distributed commit scopes using any communications manager. Users may be distributed or participants may be distributed in the same way.

General Description of the Prior Art

Standard two phase commit protocols are well known ways to allow a centralized process (i.e., the coordinator) to synchronize the "hardening" of data changes by satellite processes (i.e., participants). The two phases are the "vote" phase (i.e., sending PREPARE signals to the participants) and the "action" phase (i.e., sending COMMIT or BACKOUT signals to participants).

When the participants change recoverable data, they must inform the coordinator. When the data are ready to be committed (i.e., the user has requested COMMIT or BACKOUT), the coordinator must use the two phase commit protocol to insure that all participants go forward (i.e., commit the data) or backward (i.e., back-out the changes to the data). The coordinator must make sure that all participants perform the same action. It can never be allowed that some participants commit and some backout. Thus, the current two phase commit protocol enables data integrity among a number of participants by insuring that all participants agree before making changes to data.

Further and more detailed information on two phase commit protocols may be had by reference to the following publications:

Cruz, R., Data Recovery in IBM Database 2, IBM Systems Journal, vol. 23, no. 2, 1984.
Date, C. J., An Introduction to Database Systems, vol. II, Addison-Wesley (1983).
Gray, J. N., Notes on Data Base Operating Systems, IBM Research Report RJ2188, February 1978.
Haerder, T., and A. Reuter, Principles of Transaction-Oriented Database Recovery, ACM Computing Surveys, vol. 15, no. 4, December 1983.
Lindsay, B., and C. Mohan, Efficient Commit Protocols for the Tree of Processes Model of Distributed Transactions, IBM Research Report RJ3881, Jun. 2, 1983.

The two phase commit protocol has been applied to distributed databases with limited success. Both centralized and linear two phase commit protocols for distributed databases have been considered in the prior art. See, for example, C. J. Date, Ibid., and B. J. Lindsay et al., Notes on Distributed Databases, IBM Research Report RJ2571, July 1979. Date, for example, discusses commit protocols for distributed databases on pages 323 et seq. of his textbook.

A problem has arisen in applying a two phase commit protocol to a distributed data processing system which may have remote participants on systems connected by a variety of communications. In a distributed environment, the actions of the coordinator must span across systems which may be connected by different types of communications. Currently, the use of a two phase commit protocol in this type of environment is not easily implemented. Existing distributed commit scope systems typically rely on a single particular communication manager to act as coordinator or are limited to a distributed database manager. Moreover, the coordinator at each site in a distributed processing system is required to know the identity of all sites in the system, adding to the complexity of the coordinator.

A more flexible approach to the two phase commit protocol in a distributed system is also desirable. Conventional two phase commit protocols require that resource managers respond only in certain ways to a PREPARE signal from the coordinator, these being YES, indicating a vote to COMMIT, or NO, indicating a vote to BACKOUT, or, in an optimization to the basic two phase commit protocol, FORGET, indicating that the file is READ ONLY. However, when the coordinator is independent from the communications resource manager (such as APPC/MVS), none of these responses may be appropriate. A YES/COMMIT response causes the coordinator to force write log records for the unit of work even if there are no other resources to commit. This activity causes performance degradation, reduced system throughput, and increases system restart time. A NO/BACKOUT response causes the unit of work to be backed out. A FORGET/READ ONLY response causes the communication resource manager to no longer be involved in the unit of work, even though it may need to be.

SUMMARY OF THE INVENTION

It is therefore an object of the present invention to provide a distributed commit scope between like or unlike operating systems using any communications manager.

It is another, more specific object of the invention to provide an extension of the two phase commit protocol which allows distributed participation among physically distant agents independent of the communications mechanism being used in the data processing system.

It is a further object of the invention to enable optimizations to the two phase commit protocol when there are physically distant agents.

According to the invention, an extra stage of processing is added to the two phase commit protocol. This extra stage is called End Phase One Processing (EPOP) and enables a distribution of the coordinator function across systems using any communication mechanism. End Phase One Processing is an extra stage in which a participant can receive control. In this extra stage, a participant flows two phase commit protocol sequences to distributed systems. The communication mechanism is used in such a way that it becomes part of a distributed coordinator. The coordinator itself does not need knowledge of other systems.

The extra stage of processing is enabled by an operating system service called Enable End Phase One Exit Processing (EEPOEP). EEPOEP causes the extra stage to be used on the issuing system. In this way, not only distributed databases can be supported, but also distributed users and distributed generic resource managers (e.g., a resource manager which is a process that owns a protected resource that must survive over failures).

According to another aspect of the invention, a new response can be used by a resource manager in response to a PREPARE signal from the coordinator. This new response is called ABSTAIN. This response from the resource manager to the coordinator indicates that the resource manager wants to continue to be involved with the unit of work two phase commit process but does not want to influence the final decision (i.e., COMMIT or BACKOUT) of the unit of work. The use of the ABSTAIN response further optimizes the performance of the distributed two phase commit protocol according to the invention.

BRIEF DESCRIPTION OF THE DRAWINGS

The foregoing and other objects, aspects and advantages will be better understood from the following detailed description of a preferred embodiment of the invention with reference to the drawings, in which:

FIGS. 1A, 1B, 1C, and 1D, taken together (as shown in FIG. 1), are a block diagram of a transaction processing system of the type on which the invention may be implemented;

DETAILED DESCRIPTION OF A PREFERRED EMBODIMENT OF THE INVENTION

Figure 1C:
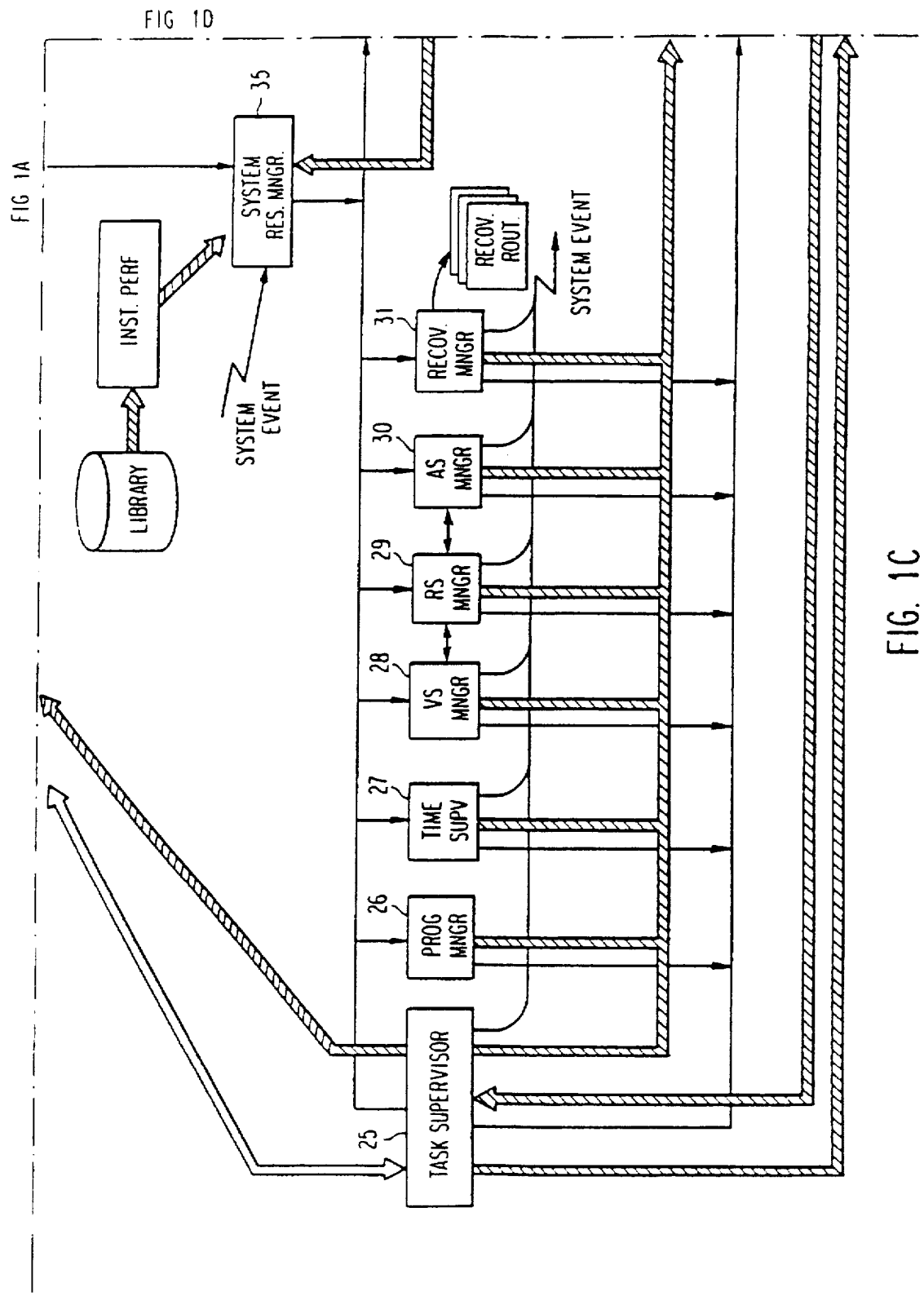
Figure 1D:
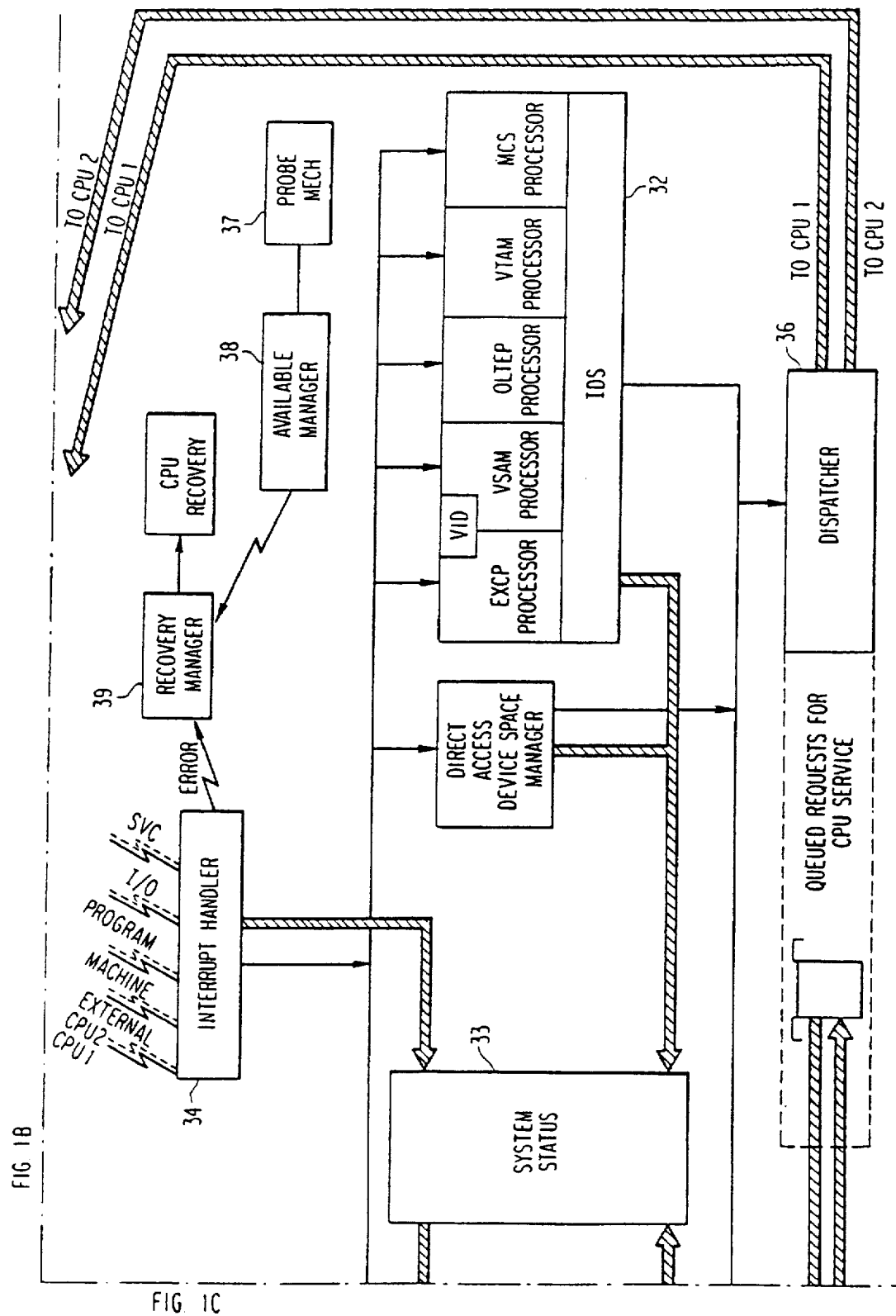

Referring now to the drawings, and more particularly to FIG. 1, there is shown a transaction processing system comprising a main frame computer 11 having a Virtual Terminal Access Method (VTAM) 12 and a Job Entry System (JES) 13 installed thereon. The VTAM 12 shown in the figure is an address space, and within that address space are access method routines which communicate with direct access storage devices (DASDs) 15, on which database and program libraries are stored, and with local terminals 16 and remote terminals 17. On-line users of the system access data via a plurality of local terminals 16 and remote terminals 17. The Job Entry System (JES) 13 communicates with both local job input/output (I/O) devices 18 and remote job I/O devices 19.

Both the VTAM 12 and the JES 13 communicate with a base operating system, also installed on the computer 11. The operating system includes a master scheduler 21 which shares system resources among a central console 22 and one or more functional consoles 23 and JES 13. The JES 13 generates a job queue which is input to a job scheduler 24, also part of the operating system, and this queue is input to the VTAM 12.

The operating system may be, for example, IBM's Multiple Virtual Storage (MVS) operating system. The MVS operating system also includes, among others, a task supervisor 25, a program manager 26, a timer supervisor 27, a virtual storage manager 28, a real storage manager 29, an auxiliary (or page) storage manager 30, a recovery termination manager 31, and in input/output system (IOS) function 32. All these communicate with a system status function 33 which receives inputs from various interrupt handlers 34 and provides an output to a system resources manager 35. In addition, the task supervisor 25 communicates with both the job scheduler 24 and a dispatcher 36. The dispatcher 36 has queued requests for central processor unit (CPU) service.

This is but a general overview of the MVS operating system and, for more information on the MVS operating system, reference may be had to Operating Systems, by H. Lorin and H. M. Deitel, Addison-Wesley (1981), and Chapter 21 of An Introduction to Operating Systems, by H. M. Deitel, Addison-Wesley (1984).

Conventional Two Phase Commit Protocol

Figure 2A:
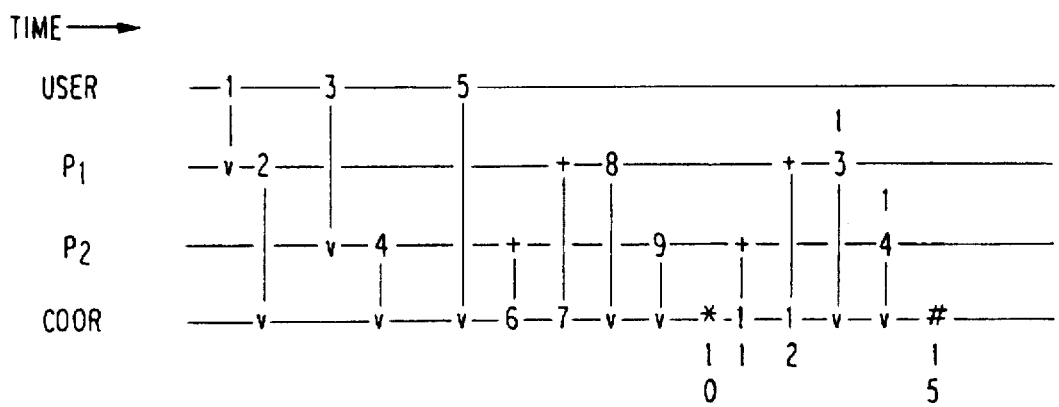
FIG. 2A is a time-line illustrating the basic operation of the current two phase commit protocol.

FIG. 2A is a time-line-which best illustrates the conventional two phase commit protocol. This time-line assumes two resource managers, $P_1$ and $P_2$, either or both of which the user may call. The resource managers $P_1$ and $P_2$ may be programs such as DB2 and IMS/DL1, for example. DB2 is an IBM database product, and IMS/DL1 is an IBM information management system product incorporating a service program that gives that transaction processing system access to a DL/1 database. It should be understood, however, that both DB2 and IMS/DL1 are merely exemplary and other and different transaction processing systems could be used. The coordinator is called COOR in FIG. 2A, and may be a module of a suitable operating system such as IBM Corporation's MVS (multiple virtual storage) operating system, described with reference to FIG. 1.

Figure 3A:
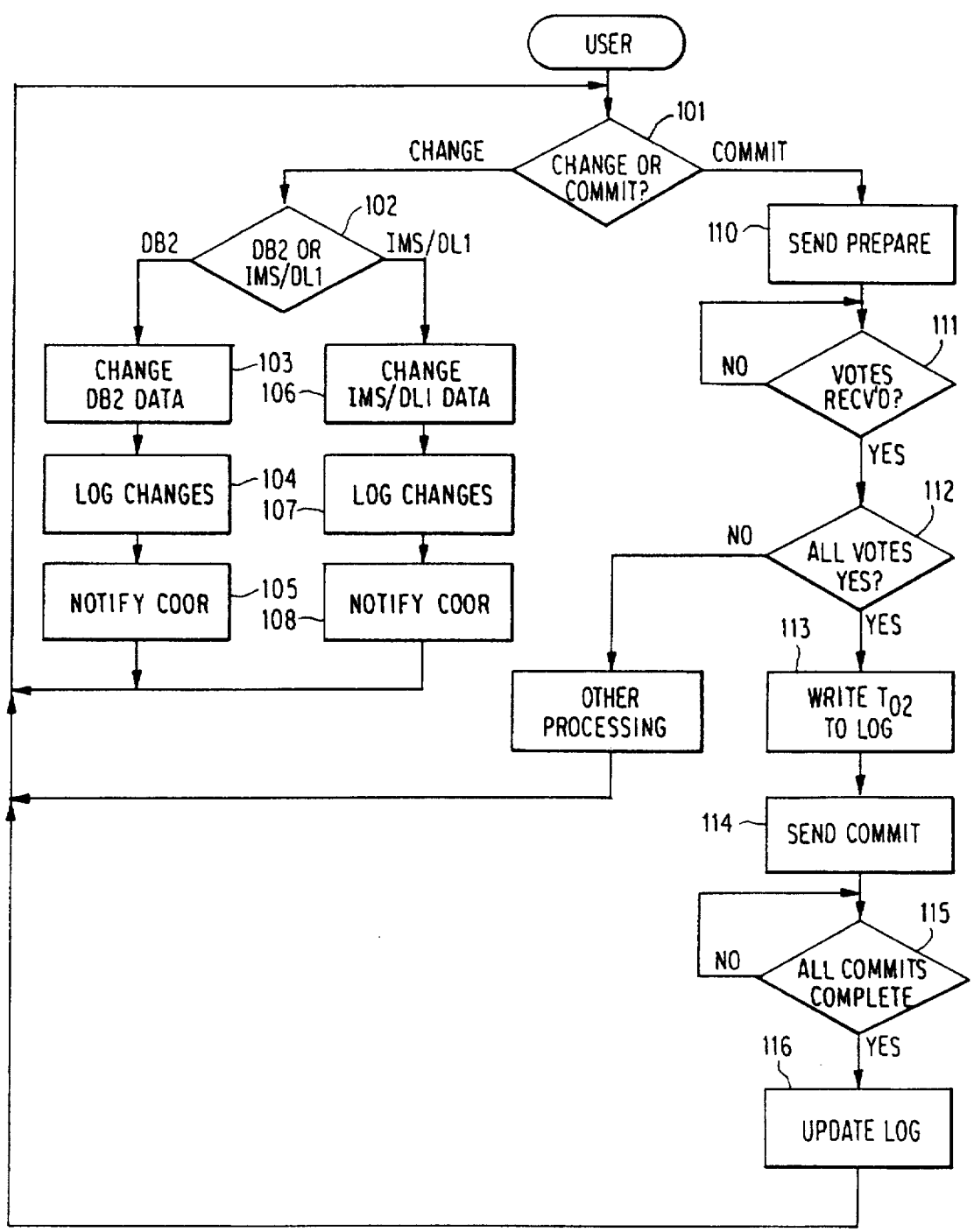
FIG. 3A is a flow chart of the basic current two phase commit protocol process represented in FIG. 2A.

With reference now to both FIGS. 2A and 3A, the process in this example begins in function block 101 of FIG. 3A by the user making a decision in decision block 101 to either change or commit/backout data. If the decision is to change data, a determination is made (for this example) in decision block 102 whether the data to be changed is $P_1$ data or $P_2$ data. If $P_1$ data, the $P_1$ data is changed in function block 103. This is indicated in FIG. 2A as step 1. When data is changed, $P_1$ privately logs these data changes, as indicated by function block 104 in FIG. 3A. Then, in function block 105 in FIG. 3A and step 2 in FIG. 2A, $P_1$ tells the coordinator (COOR) that it must be informed when this user wishes to commit or backout its data changes. At this point, a return is made to the user.

Now assume that the user changes some $P_2$ data. In this case, the process goes from decision blocks 101 and 102 to function block 106 where $P_2$ data is changed. This is indicated in FIG. 2A as step 3. As in the case of the $P_1$ data change, when data is changed, $P_2$ privately logs these data changes, as indicated by function block 107 in FIG. 3A. Then, in function block 108 in FIG. 3A and step 4 in FIG. 2A, $P_2$ tells the coordinator (COOR) that it must be informed when this user wishes to commit or backout its data changes. At this point, a return is made to the user.

The two phase commit process starts at step 5 in FIG. 2A. At this point in the example, the user decides to commit all of his data changes with the two participants, $P_1$ and $P_2$. This is done by issuing the appropriate command directly to the coordinator (COOR), as indicated by step 5 in FIG. 2A. Upon receiving this command, the coordinator must synchronize the hardening of the data changes with the two participants, $P_1$ and $P_2$. As the first step of the two phase commit protocol, the coordinator sends PREPARE signals in function block 110 to $P_2$ and $P_1$ (i.e., steps 6 and 7 in FIG. 2A). The coordinator then waits for votes from $P_2$ and $P_1$, as indicated by decision block 111 in FIG. 3A.

In FIG. 2A, $P_1$ votes YES to the PREPARE signal at step 8. This indicates that $P_1$ is ready to either harden the data changes or to back them out, whichever the coordinator tells it to do. At step 9 in FIG. 2A, $P_2$ likewise votes YES to the PREPARE signal; that is, $P_2$ is now ready to go forward or backward. At this point, the coordinator has received all the votes that it was expecting from the participants. The coordinator makes a decision in decision block 112 based on the votes to go forward, if all votes were YES, or to go backward, if not all votes were YES. This is known as the atomic instant.

In this example since both votes are YES, the coordinator makes a decision to go forward and writes a record to a log on a guaranteed hardened media, as indicated by function block 113. In FIG. 2A, this is indicated at step 10 by the "*" and signifies that the decision has been made. By writing to the log, whenever the system fails or even a resource manager fails, the coordinator is able to re-synchronize and tell each participant whether to go forward or backward. If the atomic instant record is on the log at restart, the coordinator informs the participants to go forward or backward, depending on the decision recorded in the log record. If the atomic instant log record is not on the log, then the failure occurred before a decision could be made. In this case, the action is to backout all data changes.

In the case illustrated, the coordinator sends a signal to $P_2$ to go forward (i.e., commit) in step 11 in FIG. 2A, and in step 12 in FIG. 2A, the coordinator sends a signal to $P_1$ to go forward. This commit function is indicated by function block 114 in FIG. 3A. After signaling the participants to go forward, the coordinator must then wait for each participant to acknowledge that it has hardened its data changes, as indicated by function block 115 in FIG. 3A. In FIG. 2A, $P_1$ notifies the coordinator that it has finished hardening its data changes in step 13, and $P_2$ notifies the coordinator that it has finished hardening its data changes in step 14. When these acknowledgements have been received, the coordinator can now forget the relationships between the user, $P_1$ and $P_2$. Therefore, the coordinator writes another log record, noted as "#" in step 15 in FIG. 2A, to cancel the atomic instant record it wrote earlier. This enables the coordinator to know whether a unit of work finished when it reads the log at restart. After the log has been changed in function block 116 in FIG. 3A, a return is made to the user.

The process described and illustrated in FIGS. 2A and 3A is a conventional two phase commit protocol application. It is used here for descriptive purposes only to explain the background of the instant invention. Not shown in FIGS. 2A and 3A are the private log processing details of participants $P_1$ and $P_2$. However, these "participant" log details are important in understanding a distributed commit flow. The $P_1$ and $P_2$ logs will not contain the atomic instant log record as shown on the coordinator log in FIG. 2A at step 10. Only the coordinator will have this record. The participants will instead use a series of other log entries. While important, the details of these participant log entries are not part of the subject invention.

Figure 2B:
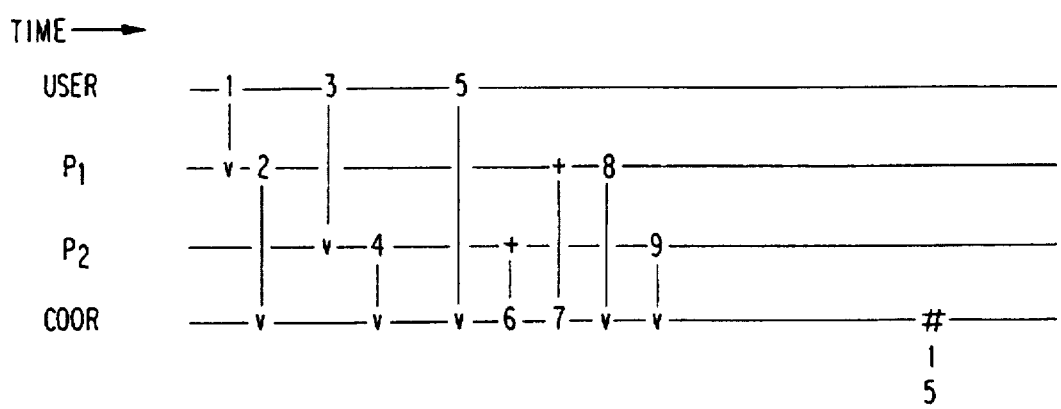
FIGS. 2B and 2C are time-lines illustrating the operation the READ ONLY optimization of the two phase commit protocol.
Figure 2C:
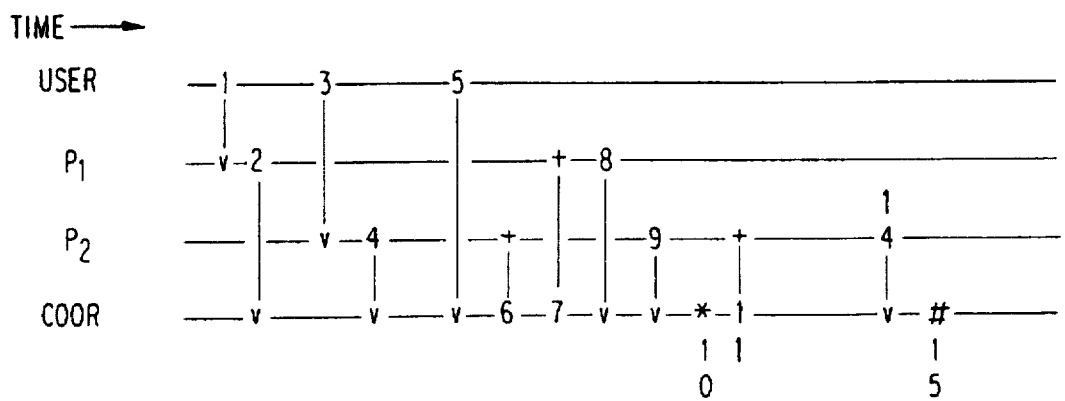
Figure 3B:
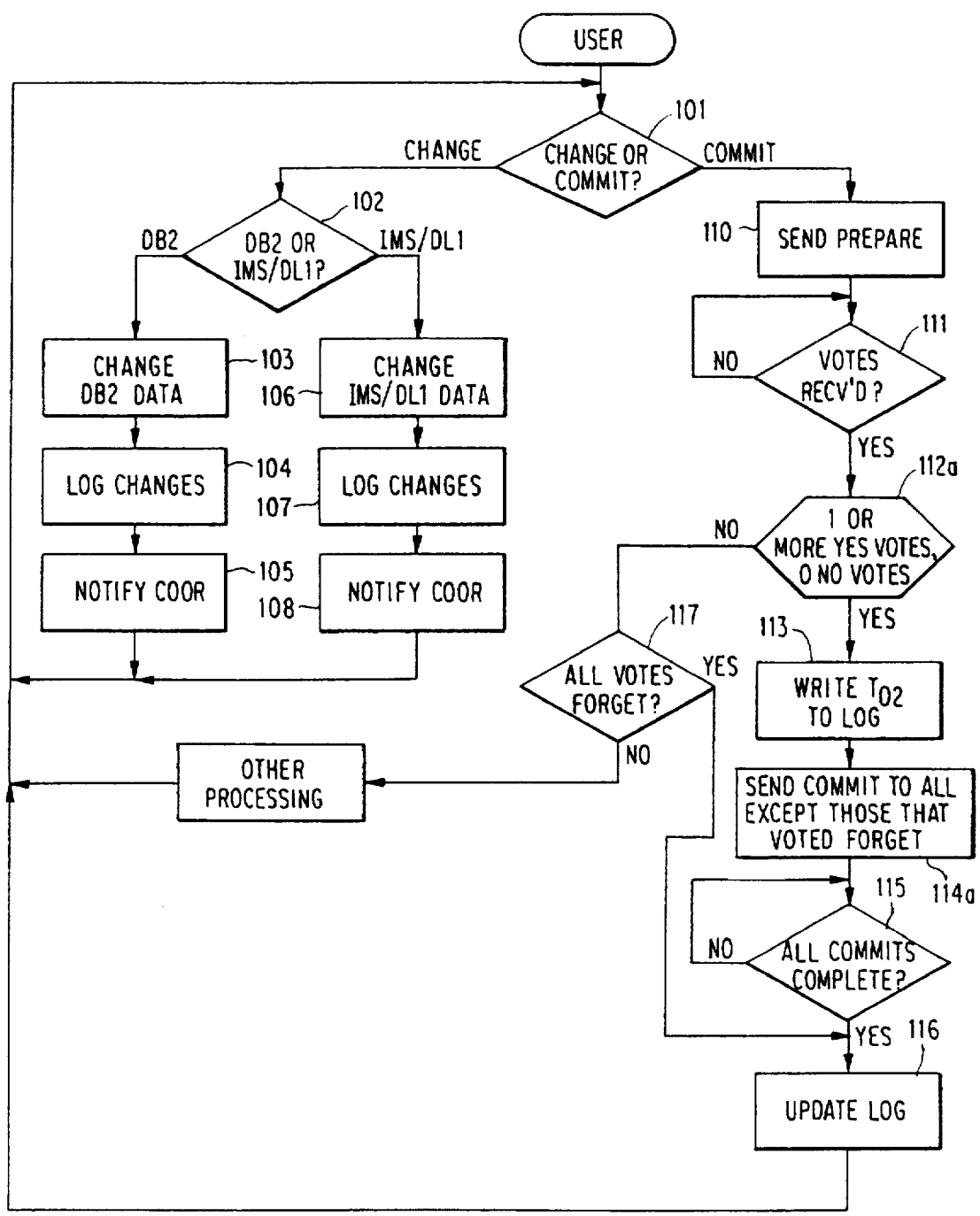
FIG. 3B is a flow chart of the two phase commit protocol process implementing the READ ONLY optimization represented in FIGS. 2B and 2C.

The basic two phase commit protocol illustrated by the time-line in FIG. 2A has been optimized by providing another response to the PREPARE signal. That response is the FORGET or READ ONLY response. FIG. 2B is a time-line, based on the time-line shown in FIG. 2A, for the case where both participants $P_1$ and $P_2$ vote FORGET in response to the PREPARE signal from the coordinator. Notice that steps 10 through 14, inclusive, have been omitted. That is, the coordinator, having received all FORGET responses, makes no decision to go forward or backward, there is no atomic instant which is recorded, and the coordinator simply forgets the relationship between the user and participants $P_1$ and $P_2$, i.e., step 15. FIG. 2C is a time-line, again based on the time-line shown in FIG. 2A, for the case where $P_1$ votes FORGET to the PREPARE signal from the coordinator, but $P_2$ votes YES. In this case, steps 12 and 13, pertaining to participant $P_1$, are omitted, but all the other steps are performed including recording the atomic instant, in step 10. FIG. 3B is a flow chart, based on the flow chart of FIG. 3A, showing the modifications to support the READ ONLY optimization for the cases shown in FIGS. 2B and 2C. In FIG. 3B, decision block 112a replaces decision block 112 in FIG. 3A. Instead of all votes being tested for YES, a test is made for the condition where at least one vote is YES and there are no NO votes. The implication here is that one vote may be FORGET (see FIG. 2C), but the presence of a YES response requires the writing to the log in function block 113 followed by the sending of a COMMIT signal in function block 114a to all participants except those that voted FORGET. On the other hand, if the condition tested for in decision block 112a is not found, then a further test is made in decision block 117 to determine if all votes are FORGET, the case illustrated in FIG. 2B. If so, then the process goes directly to function block 116 to update the log before a return is made to the user.

It has been known for some time now that the conventional two phase commit protocol does not fit well with distributed systems. See, again, Date, Ibid. The problem is that the actions of the coordinator can not easily span across systems because the systems may be connected by any type of communications (e.g., APPC or advanced program-to-program communications, TCP/IP or transmission control protocol/internet protocol, OSI/CS or others). The coordinator role must be extended and abstracted away from the mechanism used to communicate with the participants. This is done in accordance with the present invention with an extension of the two phase commit protocol which allows the coordinator role to be distributed independently of the communications mechanism used between systems.

Extension of the Two Phase Commit Protocol According to the Invention

An extra stage of processing is added to the two phase commit protocol. This extra stage of processing is called the End Phase One Processing (EPOP), and enables a distribution of the coordinator function across systems using any communication mechanism. End Phase One Processing is an extra stage in which a participant can receive control. In this extra stage, a participant flows two phase commit protocol sequences to distributed systems. The communication mechanism, whatever its type, is used in such a way that it becomes part of a distributed coordinator. The coordinator itself does not need knowledge of other systems.

The following description of the preferred embodiment of the invention will use a number of terms that must first be clearly defined. New or novel terms used, as they relate to the subject invention, are indicated by italics.

ABSTAIN reply to PREPARE—A participant that replies ABSTAIN to the PREPARE signal sent in Phase one does not influence the vote collected at the end of Phase one. The participant that replies ABSTAIN is still sent the COMMIT or BACKOUT signals in Phase two and the End Phase One exit is driven if the participant enabled the end phase one exit processing.

Agent of the Coordinator (AOC)—A sub-coordinator, acting on behalf of the coordinator. There can be many AOCs, depending on the degree of distribution of the part of the participants, or of the user. The AOC's primary role is to perform the distributed coordinator function.

atomic—Atomic is used to means "as one". A set of data changes are made atomically if they are either all done or none of them done. The state of having some changes made and others not made does not exist when they are made atomically.

atomic instant—Used to refer to a point in time when a decision is made to either commit all data changes or backout all data changes.

Atomic Instant Record (sometimes called $T_{02}$)—A record written to hardened media to indicate that the coordinator has made a commit or backout decision. Only the coordinator will write this record.

Begin Phase Two log record (sometimes called $B_{02}$)—A record written to hardened media to indicate that the AOC has received and logged the commit or backout decision from the coordinator. As with the $E_{01}$ record defined below, this is an AOC or participant activity.

commit scope—If all data changes occur on one system, the commit scope is local. If some data changes occur on more than one system, yet the user wishes these changes to be made atomically, then the commit scope is distributed.

Coordinator—The controller of the two phase commit process. In a distributed process, there is only one coordinator.

distributed—A process is distributed if it consists of several processes which reside on separate computer systems but are related.

Enable End Phase One Exit Processing (EEPOEP)—A new operating system service call which informs the local system (informs the local coordinator) that it is now an Agent of the Coordinator (AOC). That is, the local coordinator is told that it is really only one part of a distributed commit scope. There is only one coordinator in a commit scope, and this service lets the local operating system know that the coordinator resides on another system and the local system is an agent of that coordinator. This service transforms the local operating system from coordinator to AOC.

End Phase One log record (sometimes called $E_{01}$)—A record written to hardened media to indicate that the first phase of two phase commit has completed. This is an AOC or participant activity; that is, this record is never written by the coordinator. It indicates that the AOC or participant has voted in response to the PREPARE signal from the coordinator, or from an agent believed to be the coordinator (e.g., it may have come from another AOC).

End Phase One Processing (EPOP)—A new stage of processing which takes place after the End Phase One record is written to the log. It indicates that all local participants have finished voting. It further indicates the results of the voting (i.e., commit or backout). It suspends the two phase commit process and enables the participant to communicate the results of the vote to distributed systems, thereby enabling them to become part of the distributed commit scope.

log—A hardened media (typically disk storage) on which important data are stored.

participant—A "controllee" in the two phase commit process. The participant owns some resource that the user is using. Such as data in a database, or a communication path to another user. The user can cause any number of participants to become involved. A participant may be distributed.

Phase one (of two phase commit)—Often called the VOTE phase. This consists of sending PREPARE signals to participants.

Phase two (of two phase commit)—Often called the ACTION phase. This consists of sending COMMIT or BACKOUT signals to participants.

process—A process is a work unit in a computer system. It may be a user, a program product, a single thread, or multiple threads.

user—An application program which may or may not be distributed on several systems.

read-only optimization—An optimization to the two phase commitment protocol. Participants reply FORGET or READ- ONLY to the PREPARE signals sent in Phase one. Participants that reply FORGET are not sent the COMMIT or BACKOUT signals in Phase two. If all participants in the commit scope vote FORGET to the PREPARE signal, then no logging of the atomic instant, End Phase One ($E_{01}$) or Begin Phase Two ($B_{02}$) records need be performed.

Figure 4:
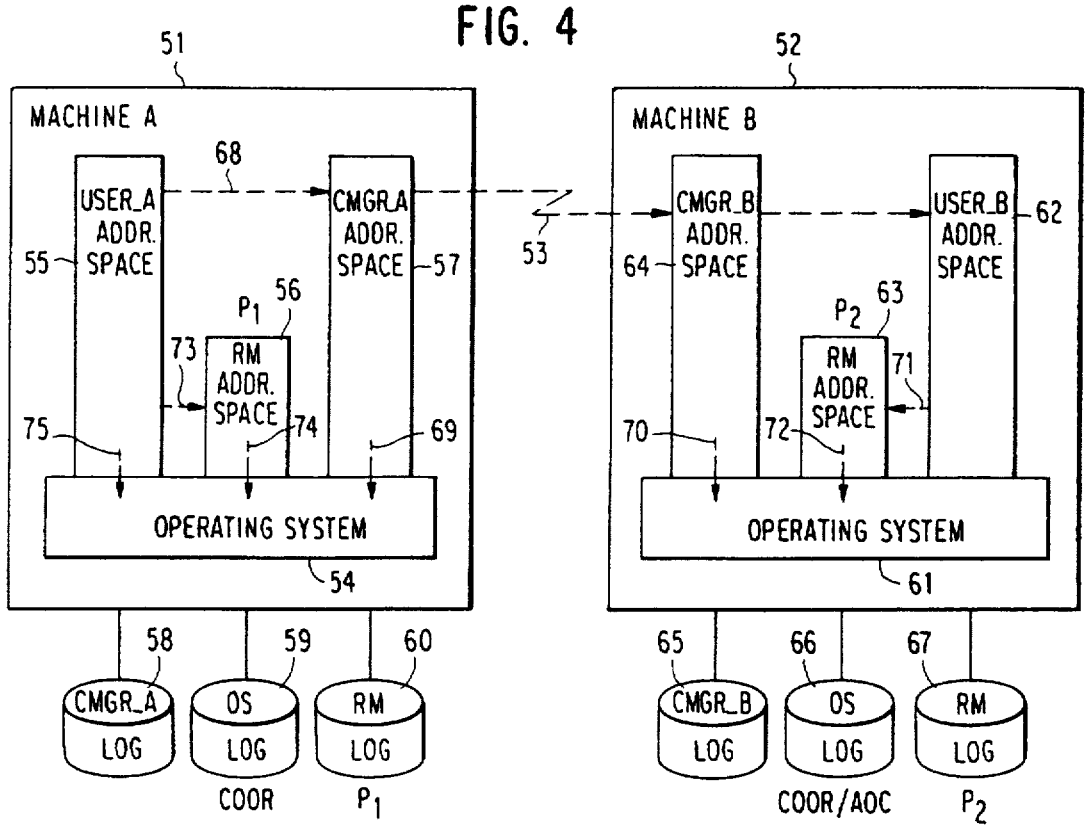
FIG. 4 is a block diagram of a multi-processor system useful in illustrating the operation of the extended two phase commit protocol according to the invention.

FIG. 4 shows a multi-processor system in which a first computer 51 (Machine A) is connected to a second computer 52 (Machine B) via a communication device 53. The device 53 may include a communication media of copper or fiber optic cable or other suitable telecommunications link. Each of the computers 51 and 52 may be considered to be a computer like computer 11 in FIG. 1 and, therefore, the block diagram in FIG. 4 is a higher level block diagram since the details of FIG. 1 are not repeated here for simplicity.

It should be mentioned here that while the two machine system shown in FIG. 4 provides a good conceptual basis for understanding what is meant by a distributed system according to the invention, it is altogether possible to have a distributed system on a single machine. For example, IBM's virtual machine (VM) operating system, VM/370, manages an IBM System 370 computer and creates the illusion that each of several users operating from terminals has a complete System 370. Moreover, each user can choose a different operating system (OS); that is, VM can actually run several different operating systems at once, each on its own virtual machine. For more information on VM, reference may be had to Chapter 22 of Deitel, Ibid.

Thus, in the following description, Machine A and Machine B may be considered to be physically separate machines (i.e., real machines) or they may be virtual machines on a single computer running under a virtual machine operating system. Obviously, in a more complex system than that shown in FIG. 4, a combination of real and virtual machines may support the distributed system on which the distributed commit protocol according to the invention may be implemented.

With specific reference to FIG. 4, computer 51 is running an operating system (OS) 54 which supports a USER A, a communication manager (i.e., CMGR__A) and a resource manager RM (i.e., participant $P_1$). The address space 55 for the USER A, the address space 56 for $P_1$, and the address space 57 for CMGR__A are all in communication with the OS 54. Attached to the computer 51 are DASDs 58, 59 and 60 on which the logs for CMGR__A, the OS, and $P_1$ are respectively written. Similarly, computer 52 is running an OS 61 which supports a second USER B, a communication manager (i.e., CMGR__B) and a resource manager RM (i.e., participant $P_2$). The address space 62 for the second USER B, the address space 63 for $P_2$, and the address space 64 for CMGR__B are all in communication with the OS 61. Attached to the computer 52 are DASDs 65, 66 and 67 on which the logs for CMGR__B, the 61, and $P_2$ are respectively written. The three logs shown on each system may be on the same or different physical storage devices.

In operation, USER A on Machine A interacts with CMGR__A, as indicated with the dotted arrow 68, and requests that a distributed piece of itself runs on Machine B. CMGR__A informs the operating system 54 that it needs to be told when USER A commits or backsout. This is indicated by the dotted line 69. CMGR__A then communicates with CMGR__B on Machine B via the communications device or link 53. Either or both of CMGR__A and CMGR__B may log private data in this transaction to respective DASDs 58 and 65. CMGR__B then starts USER B program on Machine B, if not already started, and tells the operating system 61 that it needs to be told when the USER B commits or backsout, as indicated by dotted arrow 70. USER A on Machine A and USER B on Machine B may converse, if desired, as when using APPC.

As an example of a transaction processed on the two machines, the dotted arrow 71 indicates that USER B on Machine B modifies local data on database $P_2$. $P_2$ then tells the operating system 61 it needs to be informed when either USER A on Machine A or USER B on Machine B commits or backsout, as indicated by the dotted arrow 72. The dotted arrow 73 indicates that USER A on Machine A then modifies local data on the database $P_1$. As a result, $P_1$ tells the operating system 54 that it needs to be informed when either USER A on Machine A or USER B on Machine B commits or backsout, as indicated by the dotted arrow 74. The modifications to databases $P_1$ and $P_2$ represented by dotted arrows 73 and 71 can happen repeatedly and in any order. The dotted arrow 75 indicates that USER A wants to commit all changes.

Figure 5:
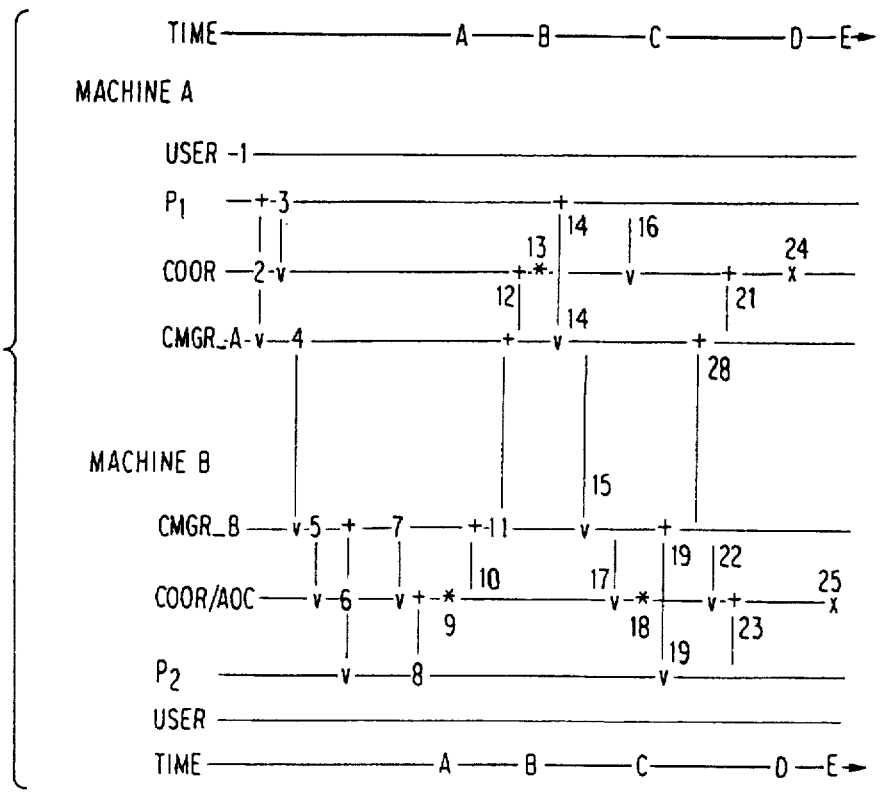
FIG. 5 is a time-line illustrating the operation of the extension of the two phase commit protocol in the two machine environment shown in FIG. 4 according to the invention.
Figure 6A:
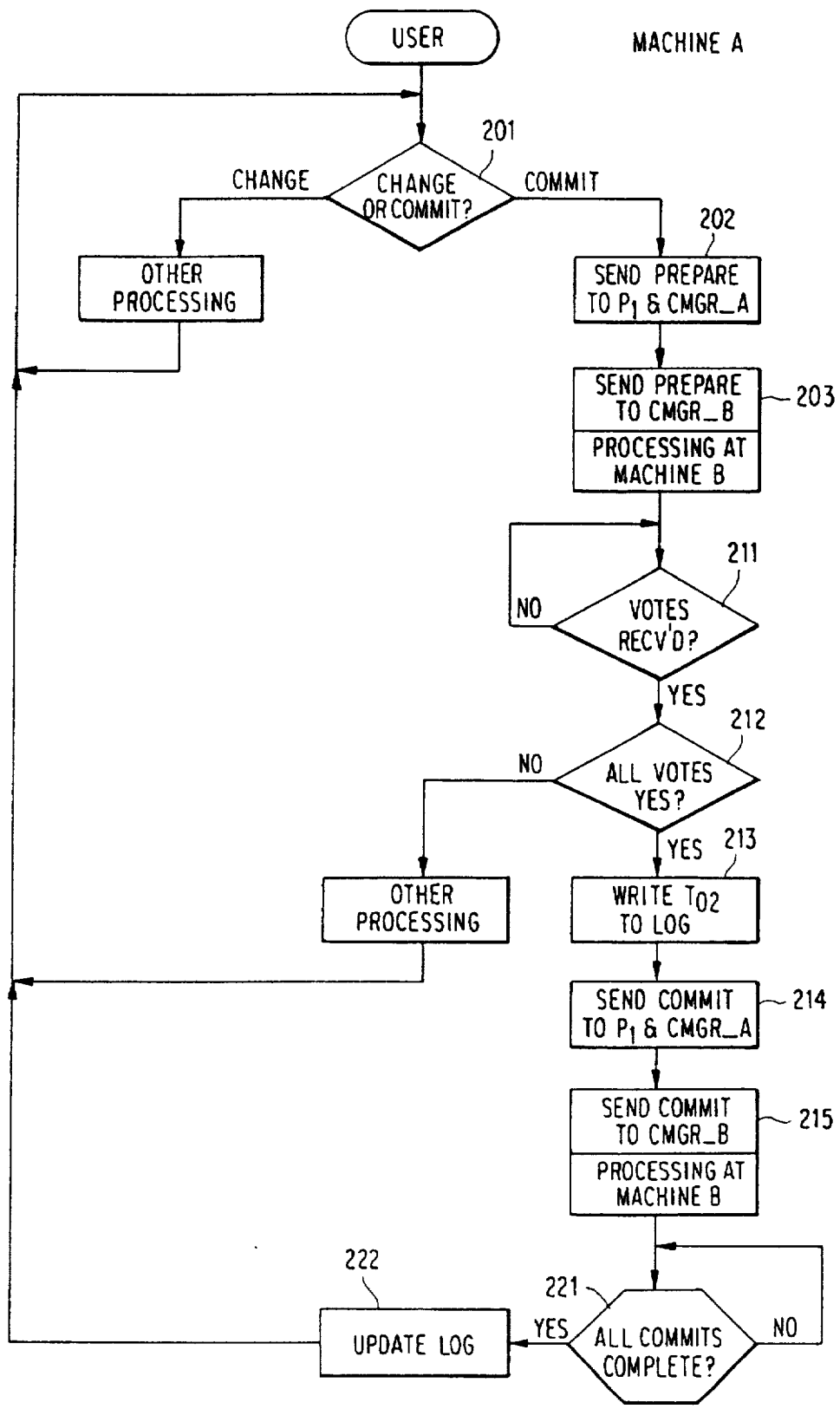
FIG. 6A is a flow chart of the process at Machine A for the extension of the two phase commit protocol process.
Figure 6B:
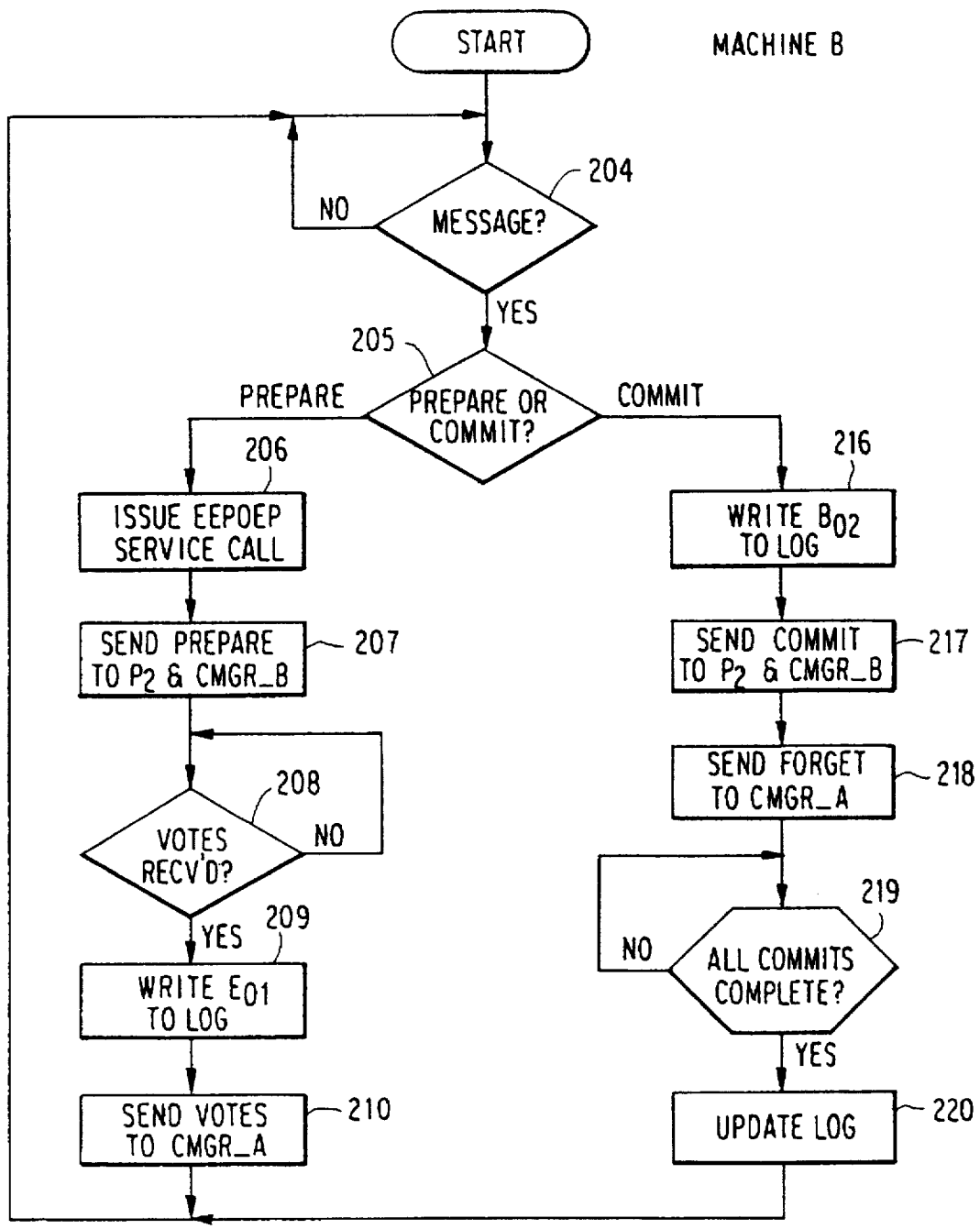
FIG. 6B is a flow chart of the process at Machine B for the extension of the two phase commit protocol process.

Referring now to FIGS. 5, 6A and 6B, FIG. 5 illustrates the roles of user, coordinator (COOR), participants ($P_1$ and $P_2$), Agent of the Coordinator (AOC), and the communication manager (CMGR) for the two machine case shown in FIG. 4. The participants $P_1$ and $P_2$ may be, for example, databases such as DB2 and IMS/DL1, as in the example illustrated in FIGS. 2 and 3. However, it should be understood that the invention is not limited to any specific applications. CMGR is actually just a participant but is distinguished because it will cooperate with the coordinator and AOCs to accomplish the distributed commit process. FIGS. 6A and 6B illustrate the use of the new operating system service (EEPOEP) and the exit processing that can be accomplished when enabled by the service EPOP.

In the case illustrated, the user is distributed. It has a process running on Machine A that changes data with a resource manager (e.g., participant $P_1$). It also has a process running on Machine B that changes data with a resource manager (e.g., participant $P_2$). It then requests that all data changes be committed. The data changes on both systems must be committed atomically. The user chooses to distribute its processing with communications manager CMGR, which could be APPC, TCP/IP, OSI/CS or other communications manager. Depending on the mechanism used, the user might request the commit process from either the coordinator or from a communications manager directly. EPOP is independent of this, provided the coordinator is informed of the user's wish to commit through some means.

As mentioned, the user has already distributed itself in the example illustrated in FIGS. 5 and 6; that is, it has processes running on two different machines that are related. Again, these machines may be real, as illustrated in FIG. 4, or virtual, i.e., running on a single computer under a virtual machine operating system. In FIGS. 5, 6A and 6B, only the commit portion of the flow is shown, as that is the source of novelty of the subject invention. Also, all participants ($P_1$, $P_2$, CMGR__A, and CMGR__B) have told the coordinator, or the AOC, about their wish to be informed when the user decides to commit or backout all data changes. Depending on implementation, sometime after that shown in the timeline of FIG. 5, the user may get a return code to indicate successful completion (i.e., all committed) or unsuccessful completion (i.e., all changes were backed out). The log records indicated are all on a log owned by the operating system. The participants may also have private logs, but these private logs are not shown.

The process starts in FIG. 6A at Machine A by detecting in decision block 201 that the user desires to commit changes. In step 1 of FIG. 5, the user indicates a desire to commit all data changes. In FIG. 6A, the coordinator broadcasts PREPARE signals to both participant $P_1$ and the communications manager CMGR__A in function block 202. This is step 2 in FIG. 5. In FIG. 6A, CMGR__A, realizing from the communication 68 in FIG. 4 that it is communicating with another system in a distributed commit sequence, sends the PREPARE signal to CMGR__B in function block 203 (step 4 in FIG. 5). This is independent of the communication manager being used.

In FIG. 6B, the process begins at Machine B in decision block 204 where a message is detected from CMGR__A. In decision block 205, the PREPARE signal is detected. When CMGR__B receives the PREPARE signal, it knows that this (i.e., Machine B) is not the home of the coordinator. It knows this because it received a PREPARE signal. Since this is not the coordinator "domain", it must be an Agent of the Co ordinator (AOC). See step 5 in FIG. 5. CMGR__B then issues the new operating system service called Enable End Phase One Exit Processing (EEPOEP) in function block 206. This informs the operating system that this is an AOC. It also will give control to CMGR__B after the End Phase One log record ($E_{01}$) is written (later at step 10 in FIG. 5). A return is then made to CMGR_B.

The AOC now broadcasts a PREPARE signal to $P_2$ and CMGR_B in function block 207. This can be in response to either (1) the user being told to issue the commit request by the communications manager or (2) the AOC assuming it is time to start the commit process when it received the new EEPOEP service call. See step 6 in FIG. 5. In the example illustrated in FIG. 5, CMGR_B votes YES to the PREPARE signal at step 7, and $P_2$ votes YES to the PREPARE signal at step 8. These votes are detected in decision block 208 in FIG. 6B.

The AOC now writes the END Phase One ($E_{01}$) record to the log in function block 209 because (1) it received its votes from all participants (CMGR_B and $P_2$) and (2) this operating system instance was informed that it is the AOC by the EEPOEP service issued at step 5 in FIG. 5. Only an AOC writes this record. This record is symbolized on the time line at step 9 in FIG. 5 with an asterisk "*". Now, the AOC, because CMGR_B had earlier issued the Enable End Phase One Exit Processing (EEPOEP) service, gives control to CMGR_B at step 10. This is a new processing stage, called the End Phase One Exit. CMGR_B is told the outcome of the PREPARE signals. In the End Phase One Exit, CMGR_B now sends a vote of YES back to CMGR_A in function block 210 in FIG. 6B. See step 11 in FIG. 5. This is the response to the PREPARE that CMGR_A sent to CMGR_B in step 4. In the example illustrated, all votes were YES, so the outcome of PREPARE was YES (i.e., go forward with commit processing). Other outcomes of the PREPARE signal are possible but are not illustrated because they do not further explain the invention.

In step 3 of FIG. 5, $P_1$ indicates its vote to prepare (YES, in this example), indicating that it is prepared to either commit or backout all data changes it has made. The vote by $P_1$ and the votes returned by CMGR_B are detected in decision block 211 in FIG. 6A. CMGR_A also votes YES to the PREPARE signal sent to it locally in step 2. It does this knowing that all participants (which may be distributed on other machines) are now in a PREPARED STATE. This knowledge comes from step 11. That is, all are ready to either go forward or backward. This occurs at step 12 in FIG. 5.

The coordinator on Machine A has now received all the votes it was expecting and, for this example, all votes were YES as detected by decision block 212. So the coordinator makes the decision to go forward and writes the atomic instant record ($T_{02}$) to the log in function block 213. This $T_{02}$ record is symbolized at step 13 in FIG. 5 by an asterisk "*". The coordinator broadcasts a commit order to local participants $P_1$ and CMGR_A in step 14. This is indicated by function block 214 in FIG. 6A. Upon receiving the commit order, CMGR_A sends the commit order to CMGR_B in function block 215. This is step 15 in FIG. 5.

In FIG. 6B, a message from CMGR_A is again detected in decision block 204. This time, however, the message is a COMMIT, as detected in decision block 205. CMGR_B has ended its End Phase One Exit by returning a decision (e.g., YES in the example illustrated) to the AOC. This is shown as step 17 in FIG. 5. The AOC now knows the End Phase One Exit has completed and the decision from the coordinator domain is to go forward (i.e., commit). The AOC writes the Begin Phase 2 ($B_{02}$) record to the local log in function block 216 in FIG. 6B. From this point forward in the recovery scenario, the local system does not need to re-establish communications with the coordinator to obtain the commit/backout decision. The decision is recorded in the $B_{02}$ log record. This record is written because this system was made into an AOC by the EEPOEP service. The $B_{02}$ record is never written by a coordinator, only by an AOC. This $B_{02}$ record is symbolized at step 18 in FIG. 5 with an asterisk "*".

The AOC broadcasts a commit order to the local participants $P_2$ and CMGR_B of Machine B in function block 217 in FIG. 6B. This is shown at step 19 in FIG. 5. Other than the log records written and the End Phase One Processing (EPOP), the AOC acts as if it were the coordinator. CMGR_B informs CMGR_A that it has finished committing the data changes (i.e., the $B_{02}$ record is safely on the log) in function block 218 (step 20 in FIG. 5). In step 22 in FIG. 5, CMGR_B makes a return to the AOC from the commit broadcast in step 19. This informs the AOC that CMGR_B is finished with its commit processing. Also, $P_2$, at some point (e.g., step 23 in FIG. 5), returns to the AOC from the commit broadcast in step 19. This is detected in decision block 219 in FIG. 6B and informs the AOC that CMGR_B and $P_2$ have completed committing data changes. Anytime after the AOC knows that all participants have completed their data changes (e.g., step 25 in FIG. 5), the AOC records this on the log in function block 220. This is a performance enhancement that speeds restart processing. While the AOC at Machine B knew that it participated in a distributed commit scope, it was not aware of the communication mechanism or protocol used. The record written is symbolized at step 25 in FIG. 5 with an "X".

At some point (step 16 in FIG. 5), $P_1$ informs the coordinator in Machine A that it has finished committing the data changes. In step 21 in FIG. 5, CMGR_A also makes a return to the coordinator from the commit broadcast in step 14. This is detected by decision block 221 in FIG. 6A. Anytime after the coordinator knows that all participants have completed their data changes (e.g., step 24 in FIG. 5), the coordinator records this on the log in function block 222. This is a performance enhancement that speeds restart processing.

The coordinator did not know that it participated in a distributed commit scope. This record is symbolized at step 24 in FIG. 5 with an "X". The key point in the example shown in FIG. 5 is to show the processing sequence and to insure that data are always coordinated. That is, at no time is it allowed to update only some of the user's data. All changes are made as requested or, if there has been any problem, all changes are reversed. The user can also choose to have all changes reversed. This new step (i.e., EPOP and EEPOEP) preserves data integrity. In the example of FIG. 5, the decision was made to go forward. A backout decision could have been made instead. That too would be recorded on the log, and similar processing would follow.

The processing illustrated by the example illustrated in FIG. 5 insures that at any time if a failure occurs, all data can be coordinated. This is often referred to as making the data consistent.

To make the description simpler, assume that a failure consists of both distributed systems shown in FIG. 5 failing together. The simpler case of only one system failing is wholly contained in the worst case scenario of both failing at once. Likewise, the case where both fail but not at the same time is also covered by virtue of the fact that the log records being used were written in a specific time ordered fashion. Finally, the case of more than two distributed systems participating in a distributed commit scope is similar. The same logic extends to a tree of height greater than two and breadth greater than one. In the example illustrated in FIG. 5, the height of the tree is two and the parent, Machine A, has one child, making it breadth one.

Refer back to FIG. 5 for the following failure case studies.

Case 1

A failure occurs before the $E_{01}$ log record is written to the log (i.e., before the time labeled A. At restart:
On Machine A $P_1$ reads its private log (not shown) and discovers that it was changing data for the user. $P_1$ asks the operating system for a commit or a backout decision. The operating system (i.e., the coordinator) does not find $T_{02}$ or $B_{02}$ on its log pertaining to the "user" and informs $P_1$ of this. $P_1$ then backs out all data changes. CMGR_A reads its private log and discovers that it was changing data for the user. CMGR_A asks the operating system for a commit or backout decision. The operating system (i.e., the coordinator) does not find $T_{02}$ or $B_{02}$ on its log pertaining to the user and informs CMGR_A of this. CMGR_A then backs out all data changes, if it has any, or ignores this user otherwise.
On Machine B $P_2$ performs processing as on Machine A of this step with the same actions.

CMGR_B performs processing as on Machine A of this step with the same actions.

Case 2

Failure occurs after the $E_{01}$ log record is written at time A but before the $T_{02}$ log record is written at time B. At restart:
On Machine A $P_1$ performs processing as in Case 1. CMGR_A performs processing as in Case 1.
On Machine B $P_2$ performs processing as in Case 1 and is informed by the operating system that the state of the user is IN_DOUBT. $P_2$ takes this to mean that the local system does not yet know whether the coordinator (on another machine) has written the $T_{02}$ record or not. That is it does not know whether the coordinator has made a commit or backout decision. At some later time, $P_2$ will be told; that is, after re-synchronization with the coordinator has been performed. $P_2$ must remember that it still must remain ready to either commit or backout all changes.

CMGR_B performs processing as in Case 1 and is informed by the operating system that the state of the user is IN_DOUBT. CMGR_B knows from information it stored in a log that the coordinator (or possibly just another AOC) is on Machine A. It reads enough information from its log to reestablish communication with CMGR_A. It then asks CMGR_A for a commit or backout decision. CMGR_A, if it has completed its restart operations, knows that the $T_{02}$ or $B_{02}$ log record was not found. CMGR_A informs CMGR_B that the decision is backout. CMGR_B informs AOC of this, and AOC informs any interested participants the decision was to backout. In the example illustrated, AOC informs $P_2$.

Case 3

The failure occurs after the $T_{02}$ log record is written (e.g., at time B) but before the $B_{02}$ log record is written at time C. At restart:
On Machine A $P_1$ performs processing as in Case 1 and is informed by the operating system that the user is in state IN_COMMIT. $P_1$ takes this to mean that the data changes for the user must be committed and does so.

CMGR_A performs processing as in Case 1 and is informed that the user is in state IN_COMMIT. CMGR_A passes this information to CMGR_B when either (1) CMGR_A re-synchronizes with CMGR_B or (2) CMGR_B asks CMGR_A for the decision for the user. CMGR_B informs the AOC of this, and the AOC then informs all interested participants that the decision is commit. In the example illustrated, the AOC informs $P_2$.
On Machine B $P_2$ performs processing as it did for Case 2.

CMGR_B performs processing as it did for Case 2, except that CMGR_A informs it that the $T_{02}$ record was found. Thus, the decision is to commit all changes. CMGR_B informs the AOC of this, and the AOC then informs all interested participants (i.e., $P_2$ in the example illustrated).

Case 4

The failure occurs after the $B_{02}$ record is written (i.e., at time C) but before either of the final records (steps 24 and 25 in FIG. 3) are written. In this case $P_1$ or $P_2$ perform processing as in Case 1 and are informed by the operating system that the state of the user is IN_COMMIT. Therefore, $P_1$ and $P_2$ commit all data changes. Meanwhile, CMGR_A and CMGR_B perform processing as in Case 1 and are informed by the operating system that the state of the user is IN_COMMIT. Depending on the protocol being used, CMGR_A and CMGR_B will exchange this information when they re-synchronize. However, since the commit or backout decision can be deduced from the available log records on each system independently, the information exchanged at re-synchronization will not be used.

Case 5

The failure occurs after either or both of the ending records at times D and E. In this case, $P_1$ and $P_2$ will either (1) be informed by the operating system that the state of the user is IN_COMMIT and will commit all data changes or (2) will be informed (or can deduce) that all work on behalf of the user has already finished and no action is required. Meanwhile, CMGR_A and CMGR_B will either (1) be informed by the operating system hat the state of the user is IN_COMMIT and will perform the actions as in Case 4 or (2) will be informed (or can deduce) that all work on behalf of the user has already been finished and no action is required.

The above recovery flow walk-though serves to show that when the participants follow the procedures outlined, data integrity is always preserved. There is no data integrity exposure above that for a standard two phase commit. The EEPOEP service and the processing in the End Phase One Exit enabled a distributed commit scope, without necessitating a distributed coordinator. That is, the coordinator was not aware of, nor was it sensitive to, a particular communication protocol or distributed network topology. By creating Agent of the Coordinator (AOC) domains with the EEPOEP service, the distribution of commit scope can continue to any number of systems. The example illustrated shows only two systems participating in the commit scope. However, any number of systems can participate using this scheme.

The coordinator function is the default, but the AOC function can be achieved with one new operating system call (i.e., EEPOEP). The cross system communications flow is still standard two phase commit. That is, in the illustrated example, the flows between Machine A and Machine B appear to be two phase commit, without extensions. The coordinator system still appears to be standard two phase commit. That is, in the illustrated example, the flows on Machine A appear to be standard. The coordinator on Machine A is not even aware that the commit scope is distributed. Rather, Machine B is transformed into an Agent of the Coordinator (AOC) from a coordinator at the appropriate time by the EEPOEP service.

From the foregoing, it will be appreciated that the invention effectively distributes the coordinator, but the coordinator does not need to have knowledge of this fact, simplifying it greatly. The coordinator function is distributed using any communication mechanism. Users need not be aware of the distributed coordinator function. Moreover, generic resource managers can be distributed, using a communications manager of their choice, by understanding this new protocol extension and communicating with the operating system synchronization point manager (i.e., coordinator). The approach is novel in that the coordinator function is distributed independently of communications. The coordinator enables a distributed commit process (i.e., extended two phase commit) without knowledge of any particular communication product. The End Phase One Processing extension allows this distribution without operating system knowledge of the coordinator function being distributed.

As a further enhancement of the extension of the two phase commit protocol to distributed participants, there is provided a new response available to a resource manager to a PREPARE signal from the coordinator. That response is the ABSTAIN response which can be used by the communication resource manger (CMGR) to reply to the agent of the coordinator (AOC) in response to a PREPARE signal. This new response allows for improved performance, more system throughput, and faster restart times on the distributed system.

Figure 7A:
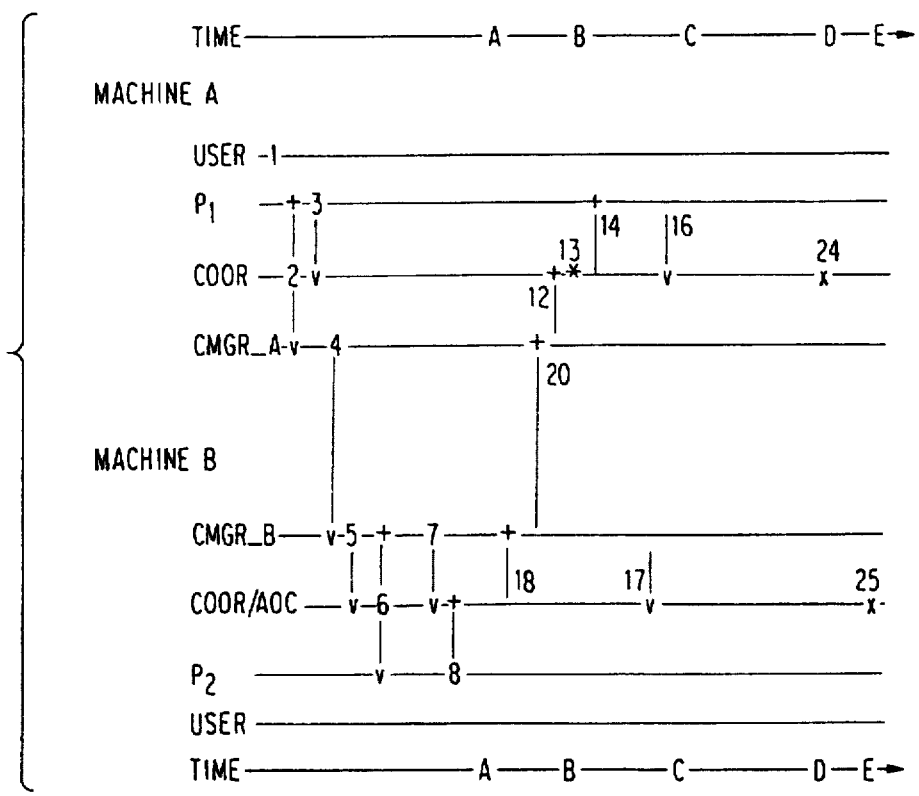
FIG. 7A is a time-line illustrating the operation of an enhancement of the two phase commit protocol which supports the READ ONLY optimization and the new ABSTAIN response for the case where all vote FORGET or ABSTAIN at Machine B and CMGR_A votes FORGET at Machine A.

FIG. 7A shows a time-line for a distributed two phase commit for the case where all participants vote FORGET or ABSTAIN at Machine B and CMGR_A votes FORGET at Machine A. FIG. 7A is based on FIG. 5, and it will be noted that several of the steps have been deleted.

Conventional two phase commit protocols require that resource managers respond in certain ways to a PREPARE request from the coordinator. The participant must respond to the request with a YES/COMMIT, NO/BACKOUT, or a FORGET/READ ONLY response to the commit coordinator. However, if the agent of the coordinator only allows responses of YES/COMMIT, NO/BACKOUT, or FORGET/READ ONLY, it is not possible to use read-only optimizations. This is due to the fact that CMGR_B must respond YES to PREPARE at step 7 in FIG. 5. This causes AOC_B to assume that there are updated committable resources on Machine B and therefore must perform the complete two phase commit process, even if participant $P_2$ replied FORGET/READ ONLY to the PREPARE signal. More particularly, FIG. 7A shows at step 7, CMGR_B votes ABSTAIN to the PREPARE signal from AOC_B. This ABSTAIN vote from CMGR_B causes the following steps from FIG. 4 not to occur:

1. End Phase One ($E_{01}$) is written to the log by AOC_B at step 9.
2. A communication response of YES is sent to Machine A at step 11.
3. A COMMIT order communication response is sent to CMGR_B at step 15.
4. A begin Phase two ($B_{02}$) is written by AOC_B on Machine B's log at step 18.
5. The COMMIT signal and a response in steps 19, 22 and 23.

All of these events are necessary when Machine B actually has two phase commit protocol resources, as for example participant $P_2$ in FIG. 5.

If participant $P_2$ is not involved with the unit of work or if participant $P_2$ only has read only resources, not all of these steps are necessary. There are READ ONLY optimizations of the two phase commit process that provide improved performance in these situations. The time-line in FIG. 7A shows the READ ONLY optimization. The unnecessary process includes the logging and communication events described above. CMGR_B can not respond NO to the PREPARE signal at step 7. This would cause the unit of work to be backed out. CMGR_B can not respond FORGET as this would cause AOC_B to assume CMGR_B no longer wants to be involved with the unit of work.

ABSTAIN is the new response provided by this invention that CMGR_B may use to reply to the PREPARE signal. This response indicates that the participant responding with ABSTAIN (CMGR_B in our example)

does not want to influence the final outcome of the PREPARE request, is willing to accept any result (YES, NO or FORGET), and wants to continue to be involved with the current unit of work two phase commit.

In FIG. 7A at step 7, rather than responding YES to the PREPARE signal, CMGR_B would respond ABSTAIN. If participant $P_2$ responds YES to the PREPARE signal, then the final result of AOC_B PREPARE signal is YES and events proceed as described above. If participant $P_2$ responds FORGET or if participant $P_2$ is not present, then the final result of the AOC_B PREPARE signal is FORGET. AOC_B gives the FORGET result to CMGR_B End Phase One Exit in step 10 in FIG. 7A. CMGR_B now sends a FORGET (step 20) communication response to Machine A rather than a YES vote at step 11. This causes Machine A to no longer contact Machine B for the unit of work. CMGR_B then returns to AOC_B which writes an "end of unit recovery" record on the log in step 25 and ends its processing for the unit of work.

Comparing the time-line of FIG. 7A to that of FIG. 5, if Machine B has read only resources, the following steps on Machine B are eliminated:

9) Logging of End Phase 1 ($E_{01}$),

11) Sending of YES response to prepare to Machine A,

15) Communication of commit order from Machine A,

18) Logging of Begin Phase 2 ($B_{02}$),

19) Passing commit order to participants on Machine B, and

22) Return from CMGR_B commit exit to AOC B. Step 20 is moved after step 10 and before step 12. The following events on Machine A are eliminated when Machine B has read only resources:

14) Commit exit call from coordinator to CMGR_A, and

21) Return from CMGR_A commit exit.

Figure 8A:
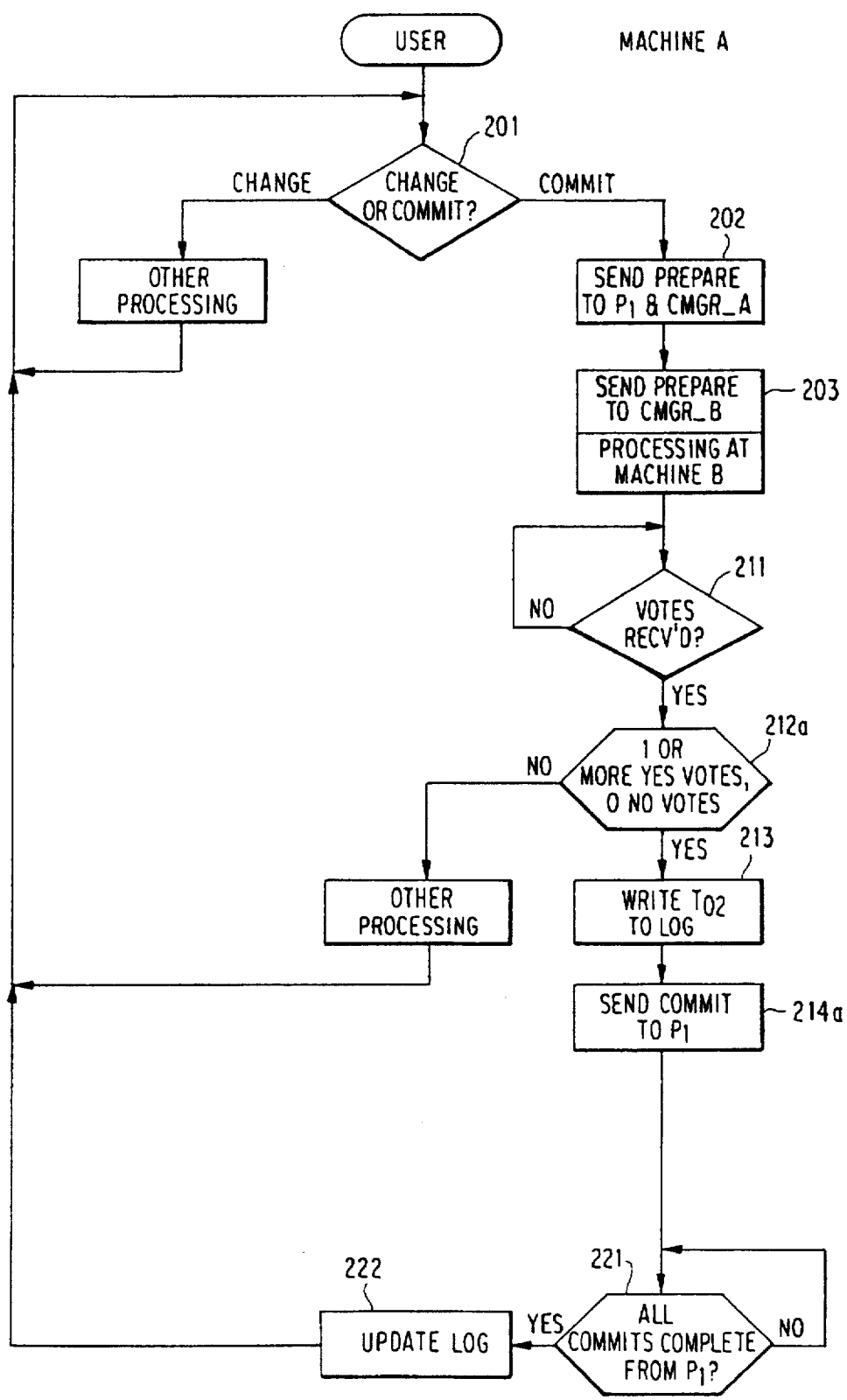
FIG. 8A is a flow chart of the process at Machine A for the enhancement of the extension of the two phase commit protocol process for the case represented in FIG. 7A.

FIG. 8A is a flow chart based on the flow chart of FIG. 6A and shows the changes in the operations at Machine A as represented by the time-line of FIG. 7A. Note that decision block 212a tests for the condition of one or more YES votes and no NO votes. This, of course, is similar to the test made by decision block 112a in FIG. 3B. In addition, function block 215 is eliminated, and function block 214a is modified to send COMMIT to participant $P_1$ only. This is because CMGR_A voted FORGET in the example.

Figure 8B:
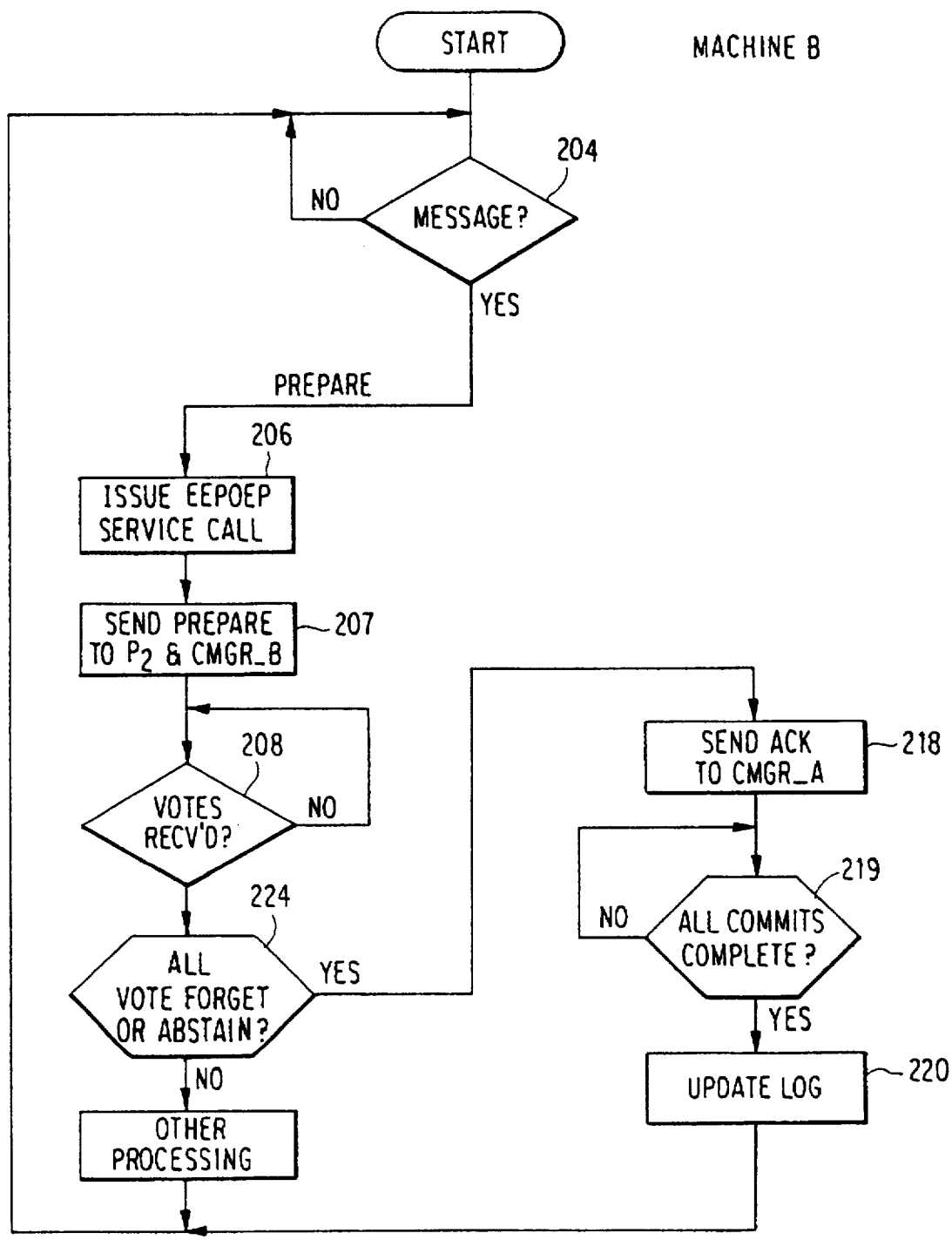
FIG. 8B is a flow chart of the process at Machine B for the enhancement of the extension of the two phase commit protocol process for the case represented in FIG. 7A.

FIG. 8B is a flow chart based on the flow chart of FIG. 6B and shows the changes in the operations at Machine B as represented by the time-line of FIG. 7A. In this flow chart decision block 205 and function blocks 209,210, 216 and 217 are eliminated. Instead of these blocks, there is a new decision block 224 which determines if the votes received are all FORGET or ABSTAIN. If so, the process goes to function block 218 where an ACK signal is sent to CMGR_A; otherwise, a return is made to the user.

Figure 7B:
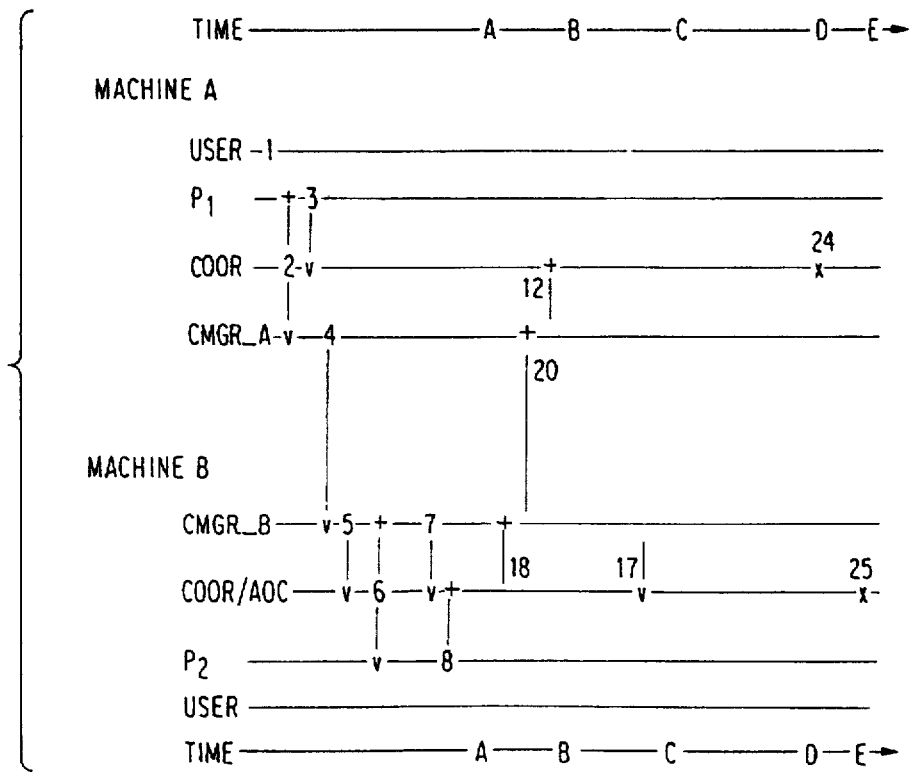
FIG. 7B is a time-line illustrating the operation of the enhancement of the two phase commit protocol which supports the READ ONLY optimization and the new ABSTAIN response for the case where all vote FORGET or ABSTAIN at both Machines A and B.
Figure 8C:
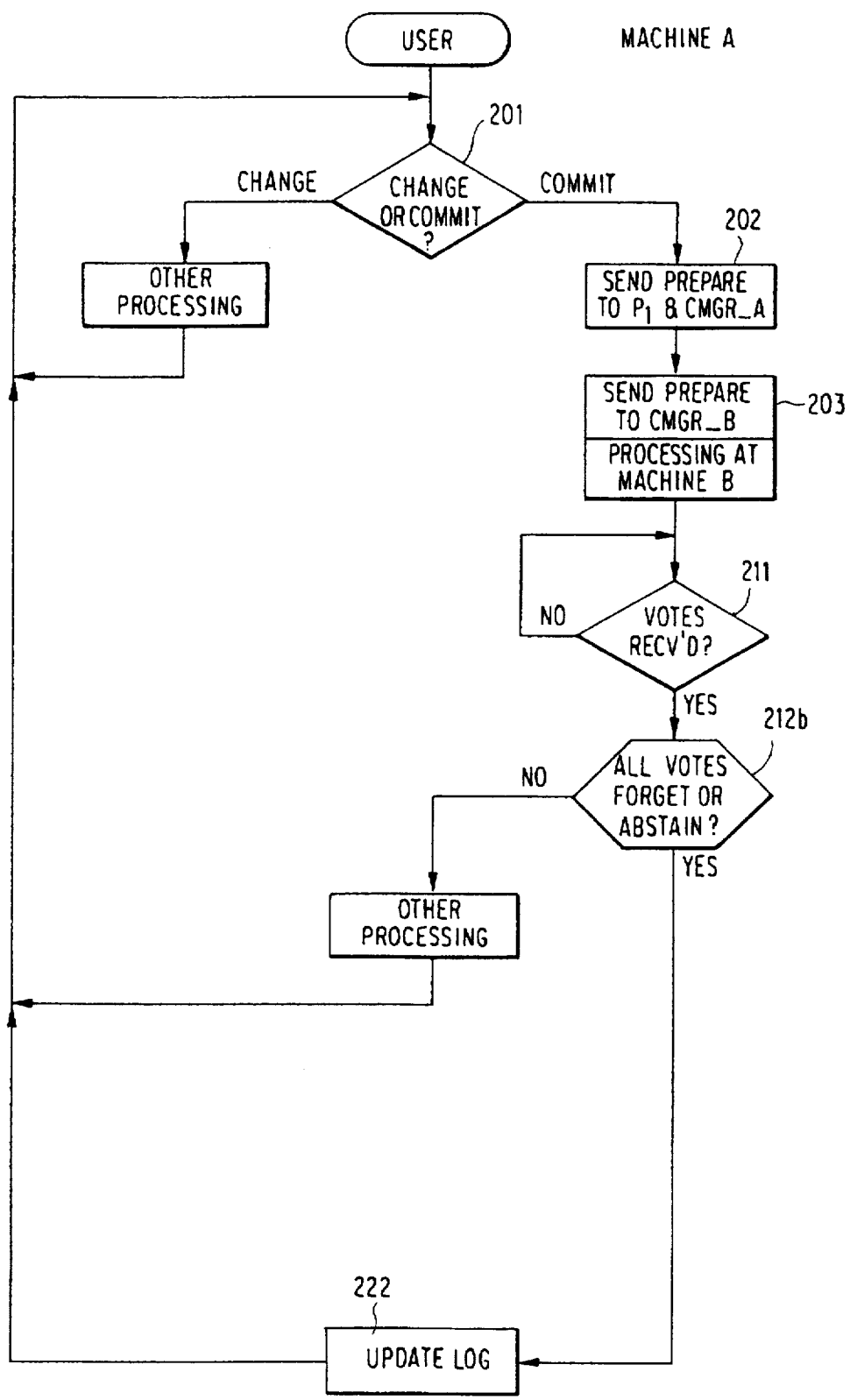
FIG. 8C is a flow chart of the process at Machine A for the enhancement of the extension of the two phase commit protocol process for the case represented in FIG. 7B.

If both Machine A and Machine B do not have any updated resources to commit (i.e., read only), then there is an additional event which can be deleted from Machine A:

13) Forced log write $T_{02}$ "atomic instant" commit record. This provides further performance improvements. The time line in FIG. 7B shows the events. FIG. 8C is a flow chart based on the flow chart of FIG. 6A and shows the changes in the operations at Machine A as represented by the time-line of FIG. 7B. Note that decision block 212$b$ tests for all votes being FORGET or ABSTAIN and that function blocks 213, 214 and 215 and decision block 221 have been eliminated. The operations at Machine B remain the same as those shown in the flow chart of FIG. 8B for the time-line shown in FIG. 7B.

The invention is not limited to distributed databases or even multi-processor systems. Any resource manager, or even a user, can be distributed on a single machine or among any number of machines and participate in one large commit scope. Therefore, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for coordinating updates in a distributed data processing system comprising the steps of:

notifying, from an external source, a first coordinator on a first system in said distributed data processing system so as to enable said first coordinator to, at a predetermined time, invoke an end-phase-one exit processing, said end-phase-one exit processing comprising a function provided by said external source for performing processing after an end of a phase-one of a plurality of phases;

enabling said end-phase-one exit processing of said first coordinator so that said first coordinator on said first system becomes a sub-coordinator of a second coordinator on a second system in said distributed data processing system, wherein said sub-coordinator notifies participants to perform said phase-one, collects votes from participants within said first system and writes an end-phase-one record of a first system vote to a log when all of said votes are collected;

notifying, by said first coordinator, participants to perform said phase-one;

collecting, by said first coordinator, all votes from all participants on said first system in said distributed data processing system;

writing, by said first coordinator, said end-phase-one record of said first system vote to said log when all votes are collected from all participants on said first system; and in response to said writing by said first coordinator of said first system, passing control, by said first coordinator, to said end-phase-one exit processing, wherein said votes include an ABSTAIN vote when a participant wants to continue to be involved with a unit of work but does not want to influence a final decision of the unit of work.

2. The method for coordinating updates in a distributed data processing system recited in claim 1 wherein said votes to prepare include at least one of YES, indicating a participant is prepared to COMMIT changes to a unit of work, NO, indicating a participant wants to BACKOUT of changes to a unit of work, and ABSTAIN, indicating a participant wants to continue to be involved with the unit of work but does not want to influence the final decision of the unit of work.

3. The method according to claim 1, wherein said first coordinator and said second coordinator are separated from said first communication manager and said second communication manager, respectively, wherein one of said first system and said second system selectively operates as a sub-coordinator for the other of said one of said first operating system and said second operating system, said other of said one of said first operating system and said second operating system being a coordinator function.

4. The method according to claim 1, wherein said first coordinator and said second coordinator are unaware of said participants on said second system and said first system, respectively, and wherein one of said first coordinator and said second coordinator selectively operates as a sub-coordinator for the other of said one of said first coordinator and said second coordinator.

5. The method according to claim 1, wherein said first coordinator and said second coordinator are unaware of said participants on said second system and said first system, respectively, and wherein said first coordinator and said second coordinator are separated from said first communication manager and said second communication manager, respectively, and wherein said first communication manager and said second communication manager are for operating without knowledge of and responsibilities to coordinate a two phase commit sequence.

6. A method for coordinating updates in a distributed data processing system using a commit protocol and including at least a first machine running a first operating system and a second machine running a second operating system, said method comprising the steps of:

sending by said first operating system a prepare signal to participants on said first machine, one of said participants being a first communication manager communicating with a second communication manager on said second machine, said first communication manager sending the prepare signal to said second communication manager;

notifying, by said second communication manager, in response to said prepare signal from said first communication manager, said second operating system to enable an end-phase-one exit so that said second operating system becomes a sub-coordinator of a coordinator function of said first operating system, said sub-coordinator notifies participants to perform a phase-one of a plurality of phases, collects votes from participants on said second machine and writes an end-phase-one record of a second machine vote to a log when all of said votes are collected, said end-phase-one record representing an end of said phase-one, said end-phase-one exit comprising a function for informing said second communications manager of a result from said phase-one processing, said second communication manager informing said first communication manager of the result from said second system in response to said first system's prepare signal;

sending by said second operating system a prepare signal to participants on said second machine;

receiving votes by said second operating system from said participants on said second machine; and passing control from said second operating system to said second communication manager of said second operating system using the end-phase-one exit, said second communication manager sending said votes to said first communication manager, wherein said votes include an ABSTAIN vote when a participant wants to continue to be involved with a unit of work but does not want to influence a final decision of the unit of work.

7. The method for coordinating updates in a distributed data processing system recited in claim 6 wherein said votes in response to prepare are at least one of YES, indicating a participant is prepared to COMMIT changes to a unit of work, NO, indicating a participant wants to BACKOUT of changes to a unit of work, FORGET, indicating a participant's vote is READ ONLY, and ABSTAIN, indicating a participant wants to continue to be involved with the unit of work but does not want to influence the final decision of the unit of work.

8. The method for coordinating updates in a distributed data processing system recited in claim 7 wherein at least some of said votes from said participants on said second machine are YES, said method further comprising the step of writing by said second operating system said end-phase-one record of a vote by said participants on said second machine to a second machine log, said step of passing control to said second communication manager being performed using the end-phase-one exit after writing to said second machine log.

9. The method for coordinating updates in a distributed data processing system recited in claim 7 wherein all of said votes by participants on said second machine are FORGET or ABSTAIN, said method further comprising the steps of:

writing by said first operating system an atomic instant record to a first machine log upon receiving all votes from participants on said first machine, said votes including votes received by said first communication manager from said second communication manager; and sending by said first operating system an action signal to participants on said first machine, said action signal being determined by an outcome of said votes, but no action signal being sent to said second communication manager due to said FORGET or ABSTAIN votes by said participants on said second machine.

10. The method for coordinating updates in a distributed data processing system recited in claim 7 wherein all votes to prepare by participants on said first machine are FORGET or ABSTAIN, said method further comprising the steps of:

writing by said second operating system said end-phase-one record of a vote by said participants on said second machine to a second machine log;

after writing to said second machine log, passing control to said second communication manager, said second communication manager sending said vote to said first communication manager;

writing by said first operating system an atomic instant record to a first machine log upon receiving votes received by said first communication manager from said second communication manager;

sending by said first operating system an action signal to said first communication manager but not to participants on said first machine voting FORGET or ABSTAIN, said first communication manager sending the action signal to said second communication manager;

writing by said second operating system an action record to said second machine log in response to said action signal received by said second communication manager; and sending by said second communication manager to said first communication manager an output that an action has been completed.

11. The method for coordinating updates in a distributed data processing system recited in claim 7 further comprising the steps of:

writing by said first operating system an atomic instant record to a first machine log upon receiving all votes from participants on said first machine, said votes including votes received by said first communication manager from said second communication manager;

sending by said first operating system an action signal to participants on said first machine, said action signal being determined by an outcome of said votes, said first communication manager sending the action signal to said second communication manager;

writing by said second operating system an action record to said second machine log in response to said action signal received by said second communication manager; and sending by said second communication manager to said first communication manager an output that an action has been completed.

12. The method for coordinating updates in a distributed data processing system recited in claim 11 further comprising the steps of:

sending by said second operating system said action signal to participants on said second machine and upon receiving acknowledgements from participants on said second machine that an action has been completed, updating said second machine log; and said first operating system, upon receiving acknowledgements from participants on said first machine, including said first communication manager, that an action has been completed, updating said first machine log.

13. The method according to claim 6, wherein said votes from at least one of said participants and said communication manager include at least one ABSTAIN vote when said at least one of said participants and said communication manager wants to continue to be involved with a unit of work but does not want to influence a final decision of the unit of work.

14. The method according to claim 6, wherein said coordinator and said subcoordinator are separated from said first communication manager and said second communication manager, respectively, one of said first operating system and said second operating system selectively operating as one of a subcoordinator for the other of said one of said first operating system and said second operating system, said first operating system being unaware of participants on said second machine and said second operating system being unaware of participants on said first machine, said coordinator and said subcoordinator being separated from said first communication manager and said second communication manager, respectively, wherein said first communication manager and said second communication manager are for operating without knowledge of and responsibilities to said extended two phase commit protocol.

15. The method for coordinating updates in a distributed data processing system recited in claim 7 wherein at least one of said votes by participants on said second machine is BACKOUT, said method further comprising the steps of:
writing by said first operating system an atomic instant record to a first machine log upon receiving all votes from participants on said first machine, said votes including votes received by said first communication manager from said second communication manager.

16. The method for coordinating updates in a distributed data processing system recited in claim 7, wherein at least one vote to prepare by participants on said first machine is BACKOUT, said method further comprising the steps of:
writing by said second operating system an end-phase-one record of a vote by said participants on said second machine to a second machine log;

after writing to said second machine log, passing control to said second communication manager, said second communication manager sending said vote to said first communication manager;

sending by said first operating system an action signal to said first communication manager but not to participants on said first machine voting FORGET or ABSTAIN, said first communication manager sending the action signal to said second communication manager; and sending by said second communication manager to said first communication manager an output that an action has been completed.

17. A distributed data processing system which implements an extended two phase commit protocol including a first phase representing a phase-one of said commit protocol, said system comprising:

at least a first machine running a first operating system, said first operating system supporting a first plurality of participants including a first communication manager;

at least a second machine running a second operating system, said second operating system supporting a second plurality of participants including a second communication manager; and communication means for interconnecting said first and second communication managers, said first operating system sending a prepare signal to said first plurality of participants on said first machine and said first communication manager sending the prepare signal to said second communication manager, said second operating system, in response to a prepare signal from said first communication manager, notifying said second communication manager to enable an end-phase-one exit so that said second operating system becomes a subcoordinator of a coordinator function of said first operating system, said subcoordinator notifies participants to perform said phase-one, collects votes from participants on said second operating system and writes an end-phase-one record of said second operating system vote to a log when all said votes are collected, said end-phase-one exit comprising a function for informing said second communication manager that said second operating system is said sub-coordinator of said coordinator function of said first operating system and informing said second communication manager of an outcome of said votes from participants on said second operating system, said second operating system sending a prepare signal to participants on said second machine, said second operating system writing said end-phase-one record of a vote by said participants on said second machine to a second machine log, and after writing to said second machine log, passing control to said second communication manager using the end-phase-one exit, said second communication manager sending said vote to said first communication manager, wherein said votes include an ABSTAIN vote when a participant wants to continue to be involved with a unit of work but does not want to influence a final decision of the unit of work.

18. The distributed data processing system recited in claim 17 wherein said first and second machines are virtual machines running on a single computer under a virtual machine operating system, said first and second operating systems being guest operating systems of said virtual machine operating system.

19. The distributed data processing system recited in claim 17 wherein said first and second machines are implemented on physically separate computers and said communication device includes a communication link interconnecting said physically separate computers.

20. The system according to claim 17, wherein said system includes means for issuing an ABSTAIN vote by any of said participants when a participant of said any of said participants wants to continue to be involved with a unit of work but does not want to influence a final decision of the unit of work.

21. The system according to claim 17, wherein said coordinator and said subcoordinator are separated from said first communication manager and said second communication manager, respectively, said first operating system being unaware of participants on said second machine and said second operating system being unaware of participants on said first machine, wherein said first communication manager and said second communication manager are for operating without knowledge of and responsibilities to said extended two phase commit protocol.

\* \* \* \* \*